United States Patent
Hong et al.

(10) Patent No.: US 9,809,228 B2
(45) Date of Patent: Nov. 7, 2017

(54) WEARABLE DEVICE AND METHOD OF OPERATING THE SAME

(71) Applicant: LG ELECTRONICS INC., Seoul (KR)

(72) Inventors: Seungbum Hong, Seoul (KR);
Sungwook Hong, Seoul (KR);
Seungyong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 14/817,368

(22) Filed: Aug. 4, 2015

(65) Prior Publication Data
US 2016/0039424 A1 Feb. 11, 2016

(30) Foreign Application Priority Data

Aug. 11, 2014 (KR) .......................... 10-2014-0103845

(51) Int. Cl.
*B60W 40/08* (2012.01)
*B60K 28/02* (2006.01)
(Continued)

(52) U.S. Cl.
CPC ............. *B60W 40/08* (2013.01); *B60K 28/02* (2013.01); *G08B 5/36* (2013.01); *G08B 6/00* (2013.01);
(Continued)

(58) Field of Classification Search
None
See application file for complete search history.

(56) References Cited

U.S. PATENT DOCUMENTS 4,706,072 A * 11/1987 Ikeyama .............. B60K 28/063
340/575
5,907,282 A * 5/1999 Tuorto .................. G08B 21/06
340/439
(Continued)

FOREIGN PATENT DOCUMENTS

CN 102881117 A * 1/2013
JP 2007-145225 A 6/2007
(Continued)

OTHER PUBLICATIONS

JP2007205764A English Translation.*
(Continued)

*Primary Examiner* — Rami Khatib
(74) *Attorney, Agent, or Firm* — Fish & Richardson P.C.

(57) ABSTRACT

Provided is a wearable device including a main body that is configured to be worn on a specific portion of a user's body, a sensing unit, provided in the main body, that senses a biological signal of a user, a storage unit that collects log information relating to the biological signal, and in which an index pattern relating to a state of the user included in the collected log information is stored, and a controller that sets a reference driving index, using the stored index pattern, in which when it is sensed that the user gets in a vehicle, the controller determines a current driving index corresponding to the biological signal that is sensed before and after the user gets in the vehicle, based on the reference driving index being set, and outputs feedback that notifies the state of the user that corresponds to a result of the determination.

17 Claims, 16 Drawing Sheets

(51) Int. Cl.
*G08B 21/06* (2006.01)
*G08B 5/36* (2006.01)
*G08B 6/00* (2006.01)
*G08B 21/04* (2006.01)
*G08B 25/08* (2006.01)

(52) U.S. Cl.
CPC ......... *G08B 21/0453* (2013.01); *G08B 21/06* (2013.01); *G08B 25/08* (2013.01); *B60W 2040/0872* (2013.01)

(56) References Cited

U.S. PATENT DOCUMENTS

| | | | |
|---|---|---|---|
| 9,427,191 B2* | 8/2016 | LeBoeuf | A61B 5/02055 |
| 9,428,034 B2* | 8/2016 | Yang | B60H 1/00742 |
| 2014/0052567 A1* | 2/2014 | Bhardwaj | G06Q 30/0631 |
| | | | 705/26.7 |
| 2014/0276244 A1* | 9/2014 | Kamyar | A61B 5/1112 |
| | | | 600/595 |
| 2015/0182113 A1* | 7/2015 | Utter, II | A61B 5/0022 |
| | | | 340/539.12 |
| 2015/0350201 A1* | 12/2015 | Cornell | G06F 17/30867 |
| | | | 726/7 |
| 2016/0016454 A1* | 1/2016 | Yang | B60R 16/037 |
| | | | 701/36 |
| 2016/0318395 A1* | 11/2016 | Cofer | B60K 28/066 |

FOREIGN PATENT DOCUMENTS

| | | |
|---|---|---|
| JP | 2007-205764 A | 8/2007 |
| JP | 2010-273155 A | 12/2010 |
| KR | 10-2009-0022909 A | 3/2009 |
| WO | 2014/028765 | 2/2014 |

OTHER PUBLICATIONS

JP2007145225A English Translation.*
CN102881117A English Translation.*
International Search Report and Written Opinion in International Application No. PCT/KR2015/008192, mailed Nov. 26, 2015, 16 pages.

* cited by examiner

WEARABLE DEVICE AND METHOD OF OPERATING THE SAME

CROSS-REFERENCE TO RELATED APPLICATIONS

Pursuant to 35 U.S.C. §119(a), this application claims the benefit of earlier filing date and right of priority to Korean Application No. 10-2014-0103845, filed on Aug. 11, 2014, the contents of which is incorporated by reference herein in its entirety.

BACKGROUND OF THE DISCLOSURE

1. Field of the Disclosure

The present disclosure relates to a wearable device capable of sensing a biological signal of a user and a method of operating the wearable device.

2. Background of the Disclosure

A terminal is broadly categorized by mobility into a wearable device and a stationary terminal. The wearable device is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

Thanks to these improvements, the terminals have evolved into various types of designs. Specifically, making the terminals more lightweight and more minimized has made it possible to realize terminals that are capable of being worn on a portion of a user's body, such as a glasses-type terminal, a watch-type terminal, a necklace-type terminal, a bracelet-type terminal, and a ring-type terminal. Furthermore, terminals that are capable of being attached to clothes are also under development. In addition, in a case where such terminals are worn on any portion of the user's body in order to be used according to a user's purpose and intention, a movement and biological signal of the user can be detected and accordingly various functions can be performed. For example, a user-tailored service can be provided based on biological information sensed.

SUMMARY OF THE DISCLOSURE

Therefore, an aspect of the detailed description is to provide a wearable device capable of providing a personalized service in association with driving of a vehicle using biological information sensed, and a method of operating the wearable device.

Another aspect of the detailed description is to provide a wearable device capable of determining whether a state of a user is suitable for allowing the user to drive a vehicle using biological information sensed, and of helping the user to return to a suitable state for safety driving, and a method of operating the wearable device.

To achieve these and other advantages and in accordance with the purpose of this specification, as embodied and broadly described herein, there is provided a wearable device including: a main body that is configured to be worn on a specific portion of a user's body; a sensing unit that senses a biological signal of a user when the main body is worn; a controller that collects log information relating to the biological signal of the user and information relating to the state of the user, and store the index pattern relating to a state of the user included in the collected log information, and sets a reference driving index, through use of the stored index pattern, in which when it is sensed that the user gets in a vehicle, the controller determines a current driving index corresponding to the biological signal of the user that is sensed a reference period of time before and after the user gets in the vehicle, based on the set reference driving index, and outputs feedback that notifies the user of the current state of the user that corresponds to a result of the determination.

In the wearable device, when it is determined that the current driving index is not suitable for allowing the user to drive, the controller may perform control in such a manner as to output the feedback that varies according to a type or degree of an abnormal signal corresponding to the current driving index.

In the wearable device, in a case where it is determined that the current driving index is not suitable for allowing the user to drive or not, the controller may output an alerting signal that alerts the user of the current state of the user is not suitable for safety driving, or outputs a notification that informs the user of the current state of the user is usable for safety driving.

In the wearable device, the alerting signal may include at least one or more, among sound, vibration, light, and a screen change, and the controller may adjust a type or strength of the alerting signal according to the current state of the user.

The wearable device may further include a touch screen to which visual information is output, in which in the case where it is determined that the current driving index is not suitable for allowing the user to drive, the controller may perform control in such a manner as to output visual information for checking the current state of the user to the touch screen, and when a predetermined touch input is sensed as being applied to the touch screen, the controller may output a corresponding feedback.|

In the wearable device, the reference driving index and the current driving index each may indicate a stress index and a drowsiness index, in which the reference driving index may indicates the stress index and the drowsiness index are a numerical value in a critical range, at which the stress index and the drowsiness index are suitable for user's safety driving, and the reference driving index may be updated each time the stored index pattern is changed.

In the wearable device, the stress index and the drowsiness index each may include an index ascending section and an index recovering section, and in the case where it is determined that the current driving index is not suitable for allowing the user to drive, the controller may search the log information relating to a situation corresponding to the index recovering section corresponding to the current state of the user, and may output the feedback that helps to create the situation corresponding to the searched log information.

In the wearable device, in the case where it is determined that the current driving index is not suitable for allowing the user to drive, the controller may perform control in such a manner as to searches the log information relating to the situation where the index recovering section corresponding to the current state of the user is the shortest.

In the wearable device, in the case where it is determined that the current driving index is not suitable for allowing the user to drive, the controller may output the feedback that helps the current driving index of the user to decrease such that the current driving index is less than the reference driving index, using the biological signal of the user that is detected in the index recovering section corresponding to the current state of the user and using external context information.

In the wearable device, in the case where it is determined that the current driving index is not suitable for allowing the user to drive, the controller may perform control in such a manner as to output a message asking for a user's opinion on the current state of the user corresponding to a result of the determination, and to reflect a response to the message being output in the reference driving index.

In the wearable device, the index pattern may be divided into a physical index pattern and an emotional index pattern for the user, and the physical index pattern may be generated based on the biological signal of the user that is sensed for the same periods of time of days, and the emotional index pattern may be generated based on the biological signal of the user that is sensed in a specific situation.

In the wearable device, when it is sensed that the user gets in a vehicle, the controller may compare the biological signal, which is sensed for a reference period of time before the user gets in the vehicle, with the stored index pattern, recognizes information on a user's activity that is done before the user gets in the vehicle, and may determine the current driving index taking into consideration the recognized information on the user's activity.

In the wearable device, when it is sensed that the user gets in the vehicle, the controller may determine the current driving index, by taking into consideration a difference between the biological signal that is sensed for the reference period of time before the user gets in the vehicle and the biological signal that is sensed after the user gets in the vehicle is changed.

The wearable device may further include a wireless communication unit, connected to a vehicle-mounted control apparatus, that receives information relating to a state of the vehicle, in which the controller may sense that the user gets in the vehicle, based on the received information relating to the current state of the vehicle, and may control the wireless communication unit in such a manner that information on the state of the user that corresponds to the current driving index is provided to the vehicle-mounted control apparatus.

In the wearable device, according to the information on the state of the user corresponding to the current driving index, the controller may control the wireless communication unit in such a manner that a control signal for changing a destination or a moving path that is set in advance is provided to the vehicle-mounted control apparatus.

To achieve these and other advantages and in accordance with the purpose of this specification, as embodied and broadly described herein, there is provided a method of causing a wearable device that is worn on a specific portion of a user's body to perform: sensing a biological signal of a user; collecting log information including information relating to the biological signal of the user and information relating to a state of the user, and storing the index pattern relating to a state of the user included in the collected log information; setting a reference driving index, through use of the stored index pattern; determining a current driving index corresponding to the biological signal of the user that is sensed a reference period of time before and after the user gets in the vehicle, based on the set reference driving index, when it is sensed that the user gets in a vehicle; and outputting the feedback that notifies the user of the current state of the user that corresponds to a result of the determination.

In the method, the outputting of the feedback may be to provide the feedback that varies according to a type or degree of abnormal signal included in the current driving index in a case where it is determined that the current driving index is not suitable for allowing the user to drive.

In the method, the determining of the current driving index may include comparing the biological signal, which is sensed for a reference period of time before the user gets in the vehicle, with the stored index pattern when it is sensed that the user gets in the vehicle, and recognizing information on a user's activity that is done before the user gets in the vehicle; and determining the current driving index taking into consideration the recognized information on the user's activity.

In the method, the determining of the current driving index may include determining the current driving index by taking into consideration a difference between the biological signal of the user that is sensed for the reference period of time before the user gets in the vehicle and the biological signal that is sensed after the user gets in the vehicle is changed, when it is sensed that the user gets in the vehicle.

The method may further include: receiving information relating to a state of the vehicle of which a vehicle system is connected to the wearable device; sensing that the user gets in the vehicle, based on the received information relating to the state of the vehicle; and providing information on the state of the user that corresponds to the current driving index to the vehicle-mounted control apparatus.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a wearable device such as a portable phone, a smart phone, a notebook computer, a digital broadcasting terminal, Personal Digital Assistants (PDA), Portable Multimedia Player (PMP), a navigation system, a slate PC, a tablet PC, an ultra book, etc.

Such wearable device may be implemented as a wearable device which can be worn on a human body, beyond the conventional concept held by a user's hand. The wearable device may include a smart watch, a smart glass, a head mounted display (HMD), etc.

Hereinafter, a configuration of the wearable device of the present invention will be explained with reference to FIG. 1A.

Figure 1A:
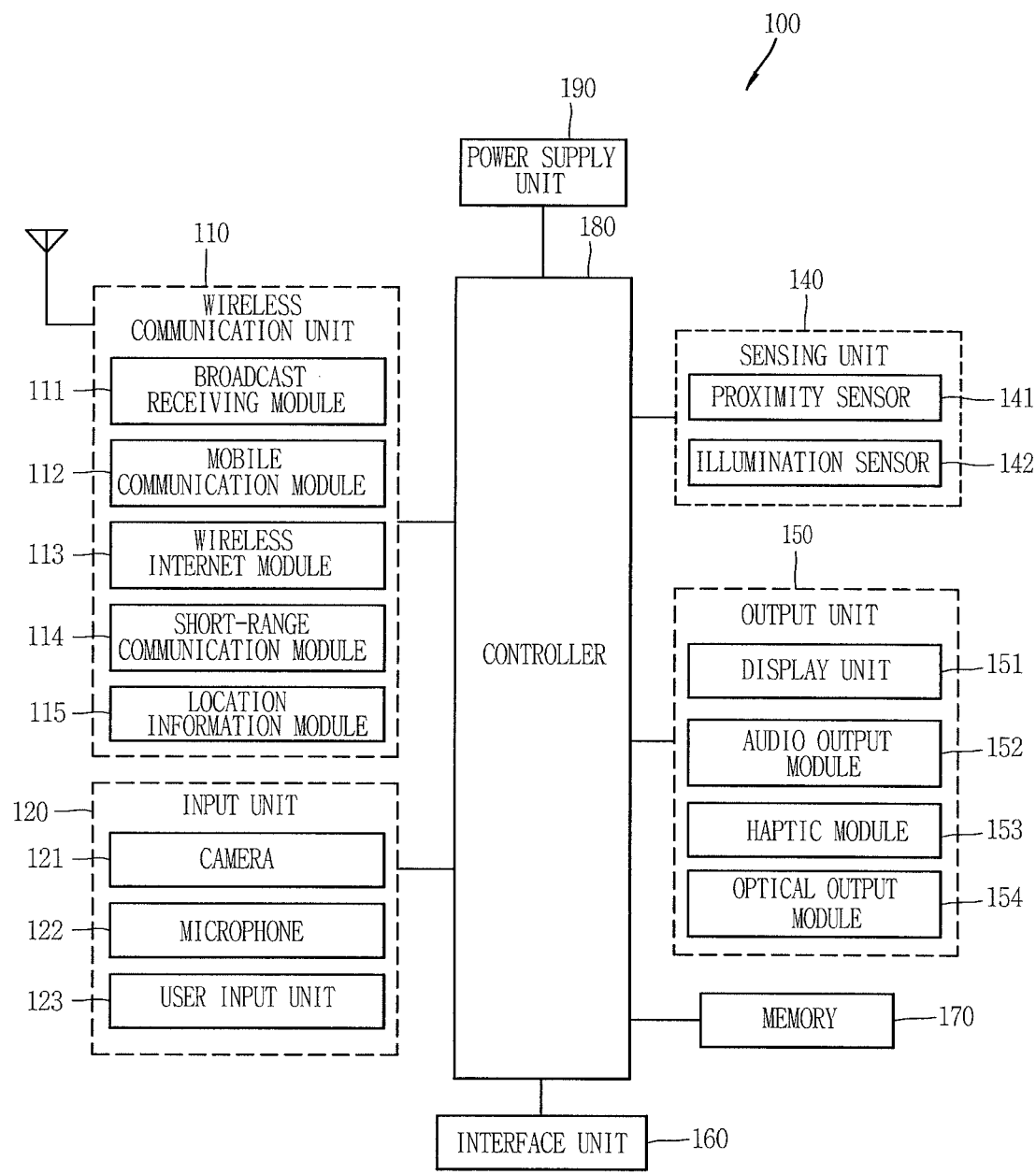
FIG. 1A is a block diagram for describing a wearable device according to the present invention.

As shown in FIG. 1A, the wearable device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the wearable device 100 and a wireless communication system, communications between the wearable device 100 and another mobile terminal, communications between the wearable device 100 and an external server. Further, the wireless communication unit 110 typically includes one or more modules which connect the wearable device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The wearable device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the wearable device 100 and a user, as well as function as the user input unit 123 which provides an input interface between the wearable device 100 and the user.

The interface unit 160 serves as an interface with various types of external devices that can be coupled to the wearable device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the wearable device 100 may perform assorted control functions associated with a connected external device, in response to the external device being connected to the interface unit 160.

The memory 170 is typically implemented to store data to support various functions or features of the wearable device 100. For instance, the memory 170 may be configured to store application programs executed in the wearable device 100, data or instructions for operations of the wearable device 100, and the like. Some of these application programs may be downloaded from an external server via wireless communication. Other application programs may be installed within the wearable device 100 at time of manufacturing or shipping, which is typically the case for basic functions of the wearable device 100 (for example, receiving a call, placing a call, receiving a message, sending a message, and the like). It is common for application programs to be stored in the memory 170, installed in the wearable device 100, and executed by the controller 180 to perform an operation (or function) for the wearable device 100.

The controller 180 typically functions to control overall operation of the wearable device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the wearable device 100. The power supply unit 190 may include a battery, and the battery may be configured to be embedded in the terminal body, or configured to be detachable from the terminal body.

Hereinafter, components of a wearable device 100 will be explained in more detail with reference to FIG. 1A, before various embodiments are explained.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the wearable device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the wearable device 100 and a wireless communication system, communications between the wearable device 100 and another wearable device 100, or communications between the wearable device and a network where another wearable device 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the wearable device uses a GPS module, a position of the wearable device may be acquired using a signal sent from a GPS satellite. As another example, when the wearable device uses the Wi-Fi module, a position of the wearable device can be acquired based on information related to a wireless access point (AP) which transmits or receives a wireless signal to or from the Wi-Fi module.

The input unit 120 may be configured to permit various types of input to the wearable device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the wearable device 100. As another example, the cameras 121 may be located in a stereoscopic arrangement to acquire left and right images for implementing a stereoscopic image.

The microphone 122 is generally implemented to permit audio input to the wearable device 100. The audio input can be processed in various manners according to a function being executed in the wearable device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the wearable device 100. The user input unit 123 may include one or more of a mechanical input element (for example, a key, a button located on a front and/or rear surface or a side surface of the wearable device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the wearable device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the wearable device 100 or execute data processing, a function or an operation associated with an application program installed in the wearable device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the wearable device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the wearable device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the wearable device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the wearable device 100. For example, the display unit 151 may display execution screen information of an application program executing at the wearable device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the wearable device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the wearable device 100.

An optical output module 154 can output a signal for indicating an event generation using light of a light source. Examples of events generated in the wearable device 100 may include message reception, call signal reception, a missed call, an alarm, a schedule notice, an email reception, information reception through an application, and the like.

A signal output by the optical output module 154 may be implemented in such a manner that the wearable device emits monochromatic light or light with a plurality of colors. The signal output may be terminated as the wearable device senses that a user has checked the generated event, for example.

The interface unit 160 serves as an interface for external devices to be connected with the wearable device 100. For example, the interface unit 160 can receive data transmitted from an external device, receive power to transfer to elements and components within the wearable device 100, or transmit internal data of the wearable device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the wearable device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the wearable device 100 is connected with an external cradle, the interface unit 160 can serve as a passage to allow power from the cradle to be supplied to the wearable device 100 or may serve as a passage to allow various command signals input by the user from the cradle to be transferred to the wearable device there through. Various command signals or power input from the cradle may operate as signals for recognizing that the wearable device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The wearable device 100 may also be operated in relation to a network storage device that performs the storage function of the memory 170 over a network, such as the Internet.

The controller 180 may typically control the general operations of the wearable device 100. For example, the controller 180 may set or release a lock state for restricting a user from inputting a control command with respect to applications when a status of the wearable device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the wearable device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
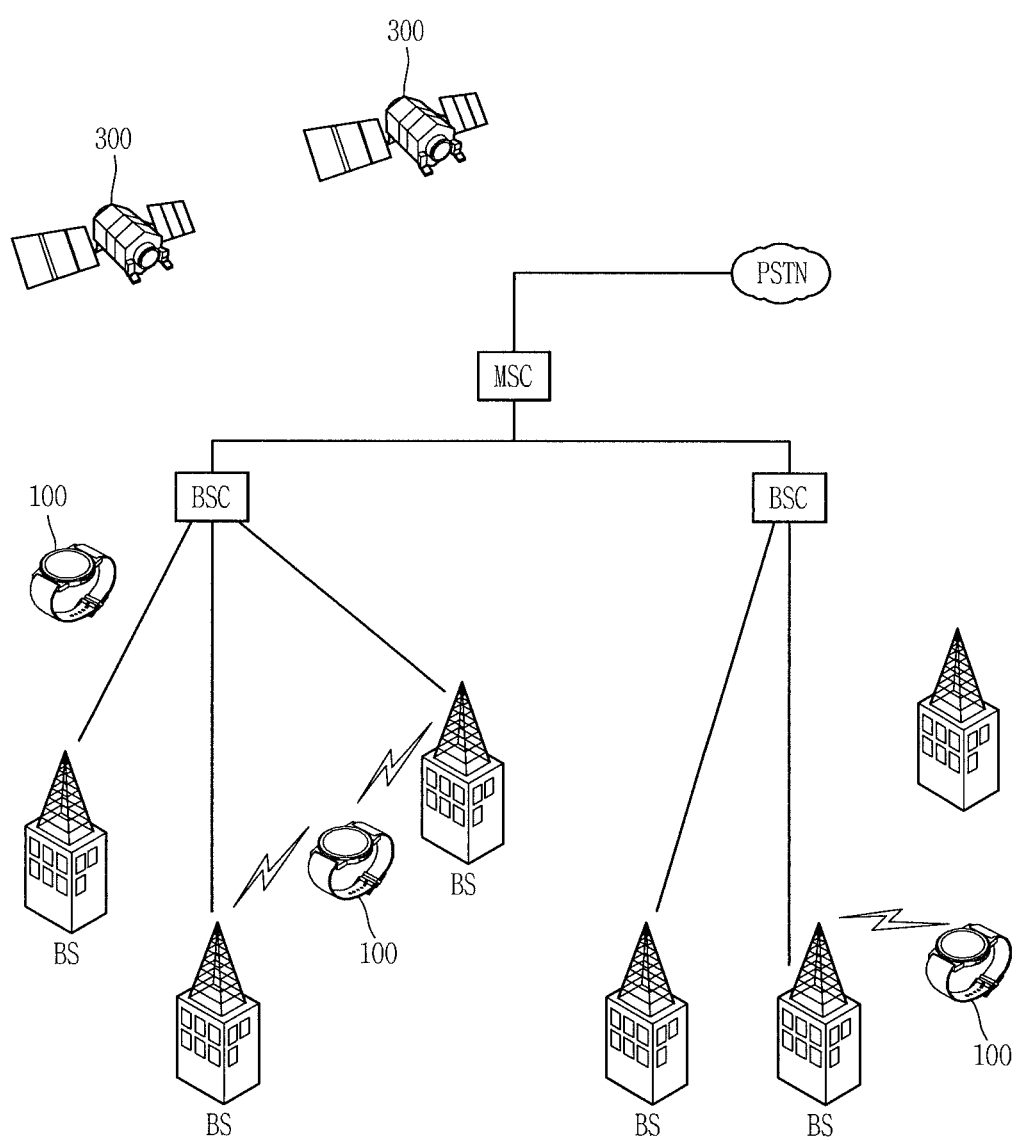
FIG. 1B is a diagram for describing a system in which the wearable device according to the present invention can operate.

FIG. 1B is a view illustrating a communication system where the wearable device 100 of the present invention is operable.

Referring to FIG. 1B, a communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the wearable device 100 to receive broadcast signals transmitted by the BT.

Global Positioning System (GPS) satellites for locating the position of the wearable device 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the wearable device according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the wearable device is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the wearable device 100. This technology typically includes the use of a Wi-Fi module in the wearable device 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The wearable device connected to the wireless AP may transmit a location information request message to the Wi-Fi location determination server. The Wi-Fi location determination server extracts the information of the wireless AP connected to the wearable device 100, based on the location information request message (or signal) of the wearable device 100. The information of the wireless AP may be transmitted to the Wi-Fi location determination server through the wearable device 100, or may be transmitted to the Wi-Fi location determination server from the wireless AP.

The information of the wireless AP extracted based on the location information request message of the wearable device 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the wearable device 100 as described above, and may extract wireless AP information corresponding to the wireless AP connected to the wearable device from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the wearable device 100 using at least one wireless AP information extracted from the database.

In addition to these position location methods, various algorithms may be used to extract (analyze) location information of a mobile terminal. Such extracted location information may be transmitted to the wearable device 100 through the Wi-Fi location determination server, thereby acquiring location information of the wearable device 100.

The wearable device 100 can acquire location information by being connected to at least one wireless AP. The number of wireless APs required to acquire location information of the wearable device 100 may be variously changed according to a wireless communication environment within which the wearable device 100 is positioned.

Figure 2:
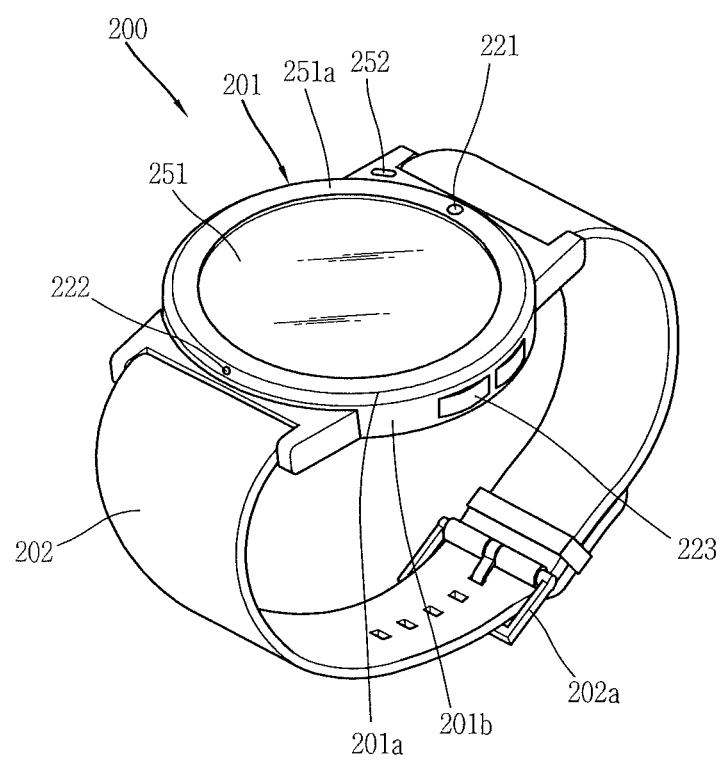
FIG. 2 is a perspective diagram illustrating a watch-type terminal as one example of the wearable device according to the present invention.

FIG. 2 is a perspective view illustrating one example of a watch-type wearable device 200 in accordance with another exemplary embodiment. As illustrated in FIG. 2, the watch-type wearable device 200 includes a main body 201 with a display unit 251 and a band 202 connected to the main body 201 to be wearable on a wrist. In general, wearable device 200 may be configured to include features that are the same or similar to that of wearable device 100 of FIG. 1A.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a wearable device 200 with a uni-body.

The watch-type wearable device 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

A wearable device 200 according to an embodiment of the present invention, which is configured to include at least one or more constituent elements described above, is worn on a specific body portion in order to sense a biological signal of the user and in advance collect log information relating to the sensed biological signal. Then, based on the collected information, the index pattern relating to the state of the user is generated and is stored. A user-tailored reference driving index is set using the stored index pattern. That is, based on the biological signal that is sensed in ordinary days, a minimum driving index suitable for driving (for example, in a case where a drowsiness index or a stress index is in a critical range suitable for driving) is set to differ from one user to another.

Next, when it is sensed that the user gets in a vehicle, the wearable device 200 determines a current driving index corresponding to the biological signal that is sensed after the user gets in the vehicle, with a predetermined driving index serving as a reference. That is, as a result of analyzing the biological signal that is sensed after the user gets in the vehicle, it is determined whether or not the drowsiness index and the stress index is suitable for driving, with a predetermined reference driving index serving as the reference. Then, feedback is output that notifies the user of the state of the user corresponding to a result of the determination. Accordingly, before starting to drive, the user can know whether or not his/her state is suitable for driving. Thus, a vehicle accident due to driver's dozing-off at the wheel and the like can be reliably in advance prevented.

At this point, the pieces of "log information" disclosed in the present specification include information relating to information relating to the biological signal of the user who wears the wearable device 200, and information relating to the state of the user. The pieces of "log information" are categorized by a current situation of the user, the time, and a place, and are accordingly collected. In addition, the "log information" may be collected only in a case where a predetermined input is applied to the wearable device 200 to enter a "recording mode."

In addition, the "index pattern" relating to the state of the user means a biological signal corresponding to the state of the user or a change pattern of the biological signal that is acquired based on the sensed biological signal. For example, change values of various biological signals that are measured while the user is in a "sleep state" are defined as specific index patterns of the sleep state of the user. In addition, the change values of the various biological signals that are measured while the user walks in ordinary days are defined as specific index patterns of a "walking motion" of the user.

In addition, the "reference driving index" indicates that the stress index and the drowsiness index that are detected based on the biological signal of the user are numerical values in the critical range, at which driver's safety driving is ensured. That is, the "reference driving index" means a minimum physical and emotional state that is required of a driver for safety driving. The "reference driving index" is generated based on the change pattern of the biological signal that is sensed in ordinary days and thus is set to differ from one user to another. For example, the reference driving index that satisfies the drowsiness index and the stress index indicating that a driver A can safely drive a vehicle differs from the reference driving index that satisfies the drowsiness index and the stress index indicating that a driver B can safely drive a vehicle.

The "reference driving index" is updated each time a change in a state of the driver is detected or the index pattern corresponding to a normal state of the driver is changed. In addition, the "reference driving index" is set to include multiple stages or levels in such a manner that a current state of the driver is recognized with more precision.

In addition, providing the "feedback" that notifies the user of the state of the user means providing information by which the user recognizes whether or not a current driving index for the driver is suitable for safety driving. For example, in a case where as a result of determining the current driving index for the driver, the likelihood of the driver dozing off at the wheel is high, there is a need to alert the user to this state in various ways in order to prevent reliably in advance a vehicle accident. In addition, the "feedback" includes situational information for increasing a current driving index for the driver to a level suitable for the safety driving.

In the existing method in the related art, when the likelihood of the driver dozing off at the wheel becomes high or the drowsy state of the driver is sensed, the driver is alerted to this in order to arouse user's attention or recommend that the driver should get rest, thereby in advance preventing a vehicle accident due to driver's dozing off at the wheel. However, even though such a state is sensed, because of a traffic situation, a driver's habit, or the like, it is difficult to expect that the driver immediately will stop driving. That is, it is difficult to prevent a vehicle accident due to the negligence of the driver.

According to the present invention, the reference driving index suitable for the safety driving is set for every user, based on biological information on the user, which is sensed in ordinary days. Then, when the user gets in a vehicle, it is determined whether or not a current state of the user is suitable for the safety driving, based on the then-sensed biological information and a predetermined reference driving index. Thus, the user is notified of a result of the determination. That is, the user can know his state in advance before starting to drive. Thus, the likelihood of the safety driving is more reliably increased, and thus, a vehicle accident due to the negligence of the driver (for example, driver's dozing-off at the wheel) is prevented more reliably in advance.

Figure 4:
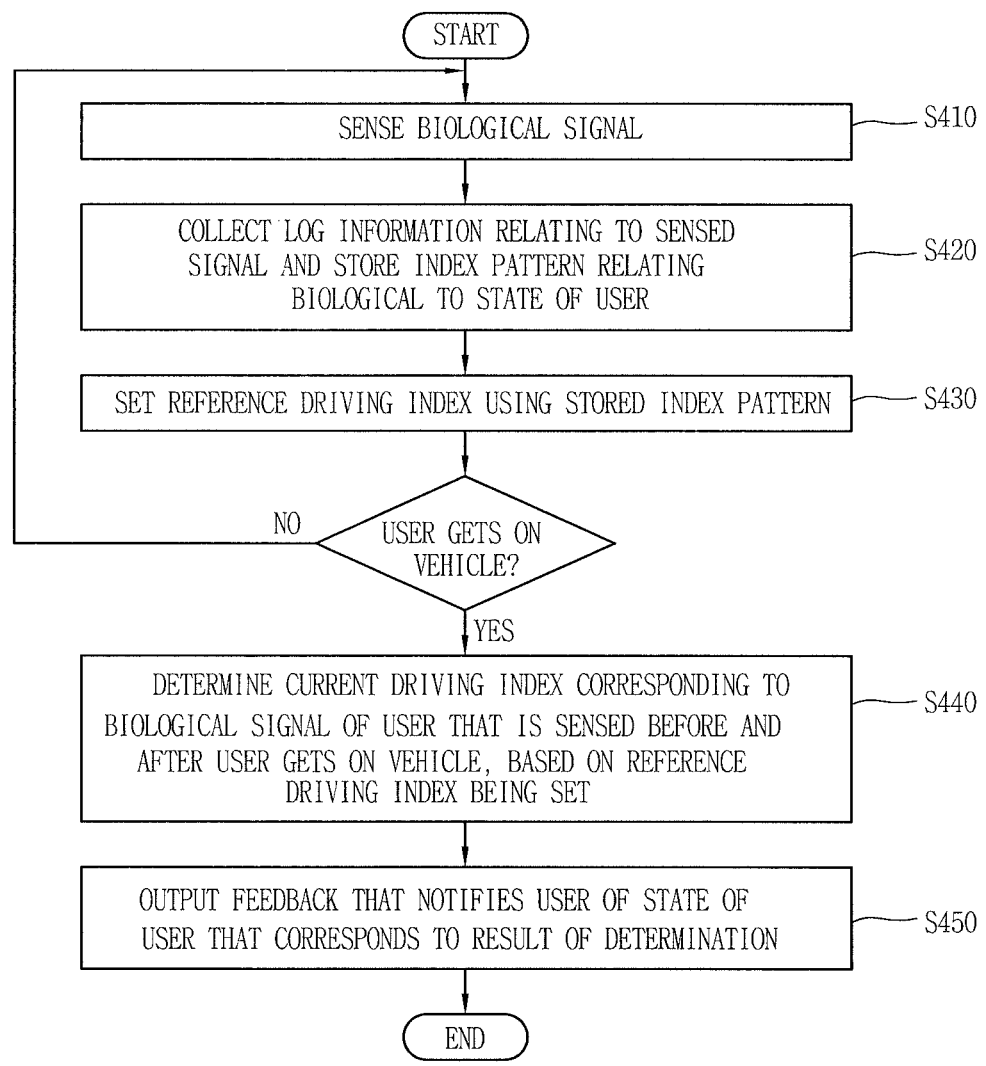
FIG. 4 is an exemplary flowchart for describing a method of operating the wearable device according to the present invention.

Referring to FIG. 4, a method of operating the wearable device according to the present invention, that is, a method of operating the wearable device for notifying the user whether or not a current state of the user is suitable for the safety driving when getting in a vehicle is described below, using a watch-type terminal 200 as an example of the wearable device.

However, embodiments of the present invention are not limited to the watch-type terminal 200, but may be realized as a wearable device in a different form that is capable of sensing the biological signal of the user or may be realized as a wearable device that is capable of communicating wirelessly with a device (for example, a link or the like) that includes a sensor which senses the biological signal of the user.

In addition, according to the present invention, operations by the watch-type terminal 200 are broadly categorized into operations that are performed before getting in a vehicle and operations that are performed after getting off the vehicle. At this time, the operations by the wearable device that are performed after getting in the vehicle are ones that are performed based on the operations that are performed before getting in the vehicle and on results of performing the operations.

First, referring to FIG. 4, the watch-type terminal 200 is worn on a specific body portion and senses the biological signal of the user for a predetermined period of time (S410).

At this point, the predetermined period of time is a specific period of time that is set by the user, or a period of time for which the watch-type terminal 200 is sensed as being worn. The predetermined period of time may be limited to a period of time for which a "biological-signal recording mode" is activated that is entered through a predetermined input after the watch-type terminal is sensed as being worn.

The biological signal of the user is sensed in a state where the watch-type terminal 200 is worn, or is received in a state where the watch-type terminal 200 is connected to a device that senses the biological signal of the user.

In a case where the biological signal of the user is sensed through the watch-type terminal 200, the watch-type terminal 200 is sensed as being worn, using various methods. For example, an inclination and a movement of a main body of the watch-type terminal are sensed in order to sense whether or not the main body is worn. To do this, the main body further includes a gyro sensor that senses a spatial movement of the terminal with respect to an X-axis, a Y-axis, and a Z-axis, an inclination sensor, and the like. In addition, it is determined whether or not the watch-type terminal 200 is worn, according to picture information that is captured through a camera, or according to whether or not one end of a fastener 202a provided to a band 202 is connected to the other end. In addition, in a case where after the user wears the main body, a specific key is pressed or a predetermined voice command is input, the main body is sensed as being worn.

When in this manner, the main body is sensed as being worn, the biological signal of the user is periodically detected through various sensors provided to the watch-type terminal 200.

At this point, the biological signal is an electrical signal that occurs in the body of the user on which the watch-type terminal 200 is worn. For example, the biological signal is one among an electrocardiogram (ECG) signal, a photoplethymogram (PPG) signal, and galvanic skin response (GSR) signal, but is not limited to these and may include various types of signals that, in the related art, are in wide use for measuring sleep stages. For example, the watch-type terminal 200 further includes a body temperature sensor, a cardiac impulse sensor, a pressure sensor and the like, and further acquires the biological signals that are sensed by these sensors.

The electrocardiogram (ECG) signal is an electrical signal that results from heart's electric activities occurring on the skin surface. The ECG signal is measured by inducing active electrical current, which occurs at heart muscle according to heart beats, into two suitable areas on the surface of the body. A psychological state of the user who wears the watch-type terminal 200 is identified by periodically observing characteristics of a period and a waveform of the ECG.

An electromyogram (EMG) signal is an electrical signal that results from muscle contraction, muscle activities, and muscle fatigue degree occurring on the skin surface. The EMG detects muscle movements according to movements of the user's finger that are sensed by the watch-type wearable device 200 being worn. Specifically, a carpal tunnel within the wrist of the user of the wearable device has finger flexor tendons of muscles that control movements of fingers. The finger flexor tendons have 9 tendons and one nerve, and if the finger moves, the 9 tendons included in the finger flexor tendons are moved in various combinations. A sensing unit 140 senses shapes of the tendons that are changed according to the movements of the fingers or the movement of the wrist, and a controller 180 determines what gesture is made with the fingers, based on sensed information.

An electroencephalogram (EEG) signal is an electrical signal that results from concentration or brain activities in response to an external stimulus occurring on the skin surface. The EEG signal is measured by inducing a change in electric potential, which occurs in a human cerebrum, or brain electric current resulting from the change, into a sclap.

The EEG is divided into 6 types according to frequency characteristics. Generally, a delta type indicates a "sleep" state, a theta type a "drowsy state," an alpha type a "comfortable state," a low beta type an "concentrated state," an middle beta type a "watchful state," and a high beta an "excited state." That is, a personal psychological state of the user is determined through the EEG.

In addition, the galvanic skin reflex (GSR) signal is an electrical signal that results from a change in skin resistance to activities of a sympathetic nerve occurring on the skin surface. The GSR signal is acquired by measuring a phenomenon in which electric resistance that occurs in the skin of the living body due to an external stimulus or emotional excitement is decreased temporarily or the active electric potential occurs. When the user is under tension or wakes up and thus a sympathetic nervous system of the user is activated, sweat glands in the surface of a skin are activated, thereby increasing the GSR.

In addition, a heart rate variability (HRV) is an electrical signal that results from a change in an R-peak R-peak Interval (R-R Interval (RRI)) of the electrocardiogram occurring on the skin surface. A frequency domain power spectrum of the heart rate variability is acquired by performing Fourier transform on an RRI time-series signal. A low frequency (LF: 0~0.15 Hz) domain of the power spectrum reflects activities of the sympathetic nervous system of the user, and a high frequency (HF: 0.15~0.4 Hz) indicates activities of a parasympathetic nervous system.

In addition, the photoplethysmogram (PPG) signal is an electrical signal that is acquired by measuring alternating increase and decrease in an arterial blood volume at a blood vessel of the end of a finger in synchronization with a heartbeat. Transmitted light detected in a light receiving unit at the end of a finger is received and appears into a wave form indicating a change in blood flow, which is synchronized with the heartbeat. An amount of the transmitted light is acquired by subtracting an amount of finger-absorbed light from the incident light. The resulting waveform is a PPG.

Physical and psychological states of the user who wears the watch-type terminal 200 are determined by taking into consideration at the same time correlations among various biological signals that are sensed in this manner. Then, the biological signals are stored along with the situational information and the time information. When the biological signals are accumulated for a predetermined period of time, a meaningful data group relating to a user life pattern is acquired.

Next, the log information relating to the sensed biological signal of the user is collected, the index pattern relating to the state of the user, which is included in the collected log information, is generated, and the generated index pattern is stored in a storage unit 170 (refer to FIG. 1A) (S420).

At this point, the "log information," as described above, includes the information relating to the biological signal of the user who wears the watch-type terminal 200, and the information relating to relating to the state of the user. The pieces of "log information" are categorized by a current situation of the user, the time, and a place, and are accordingly collected.

To do this, in a case where an abnormal signal (for example, an abrupt increase in the PPG and the like or a changed signal (for example, wake-up, sleep) is included in the sensed biological signal, a log information collection unit (not illustrated) or the controller 180 collects the time at which such a signal is sensed, information on a movement of the user at the time, external situational information (external context), positional information on the watch-type terminal 200, and the like, as the "log information."

For example, the collected log information relates to at least one among the time at which the abnormal signal (for example, an abrupt increase in the GSP) in the sensed biological signal is sensed, a position of the watch-type terminal 200 corresponding to the time at which the abnormal signal is sensed, surrounding-environment information (for example, weather, ambient noise level, and the like) on the watch-type terminal 200. In addition, the collected log information relates to at least one among the time at which cancellation of abnormal signal (for example, a decrease in the GSR) is sensed, the position of the watch-type terminal 200 corresponding to the time at which the abnormal signal is sensed as being cancelled, and the information on the movement (exercise, sleep, or the like) of the user.

Even though the user does not make a request for the log information, the log information is automatically collected in a case where the watch-type terminal 200 is worn.

On the other hand, when the log information is collected in this manner, the watch-type terminal 200 generates the index pattern relating to the state of the user using the collected log information. At this point, the "index pattern" means the biological signal corresponding to the state of the user or the change pattern of the biological signal, which is acquired based on the sensed biological signal. For example, the change pattern for the user as an individual in terms of various biological signals that are measured while the user is in the "sleep state," for example, in terms of the ECG, the EMG, the EEG, the HRV, the PPG, and the like is the index pattern for the "sleep state."

On the other hand, the controller 180 of the watch-type terminal stores together a shape of the index pattern, duration time, and positional information that correspond to a specific state (for example, sleep, exercise, or the like) of the user.

Figure 3A:
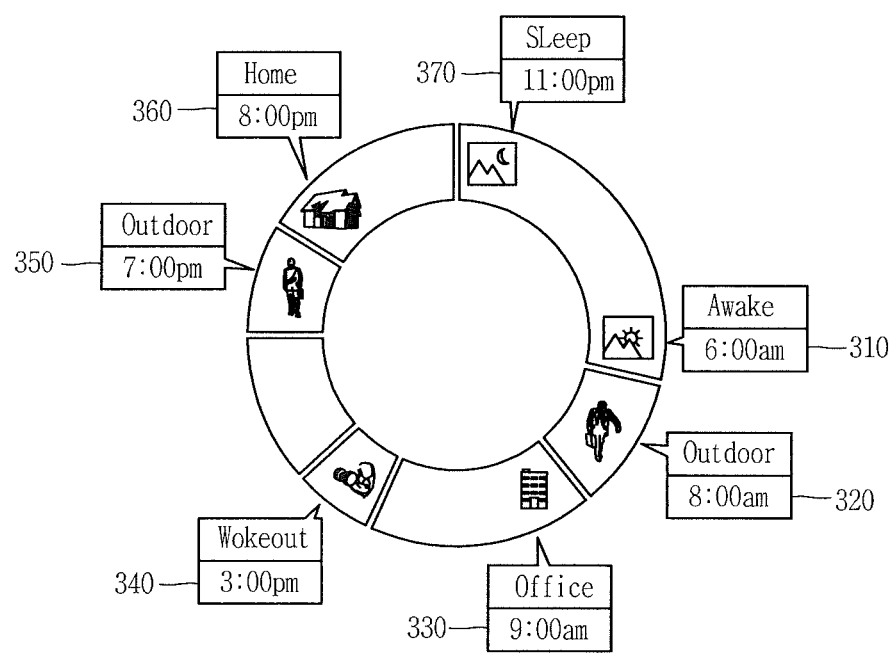
FIG. 3A is a diagram for describing a method of collecting log information relating to a biological signal of an user and generating an index pattern relating to a state of the user in the watch-type terminal according to the present invention.

FIG. 3A is a diagram for describing a method of collecting the log information relating to the biological signal of the user and generating the index pattern relating to the state of the user in the watch-type terminal 200.

The log information collection unit (not illustrated) or the controller 180 of the watch-type terminal 200, as illustrated in FIG. 3A, generates the index pattern relating to the state of the user based on the information that is collected for a reference period of time, for example, for one day.

For example, in FIG. 3A, in response to switching of the sleep state of the user to a wake-up state through the biological signal sensed through the watch-type terminal 200, the information on the time (for example, 6:00) when the switching to the wake-up state takes place and the change pattern of the biological signals at the time are detected to generate an individual index pattern 310 of the "wake-up state." A graph plotting the index pattern is not illustrated in FIG. 3A. Thereafter, when the change values of the biological signals. that are the same as or similar to the generated index pattern 310, the watch-type terminal 200 recognizes that the user is in the "wake-up state."

In addition, based on the sensed biological signal, the controller 180 sets in advance a boundary value of an algorithm for determining that the sleep state of the user switches to the wake-up state. In addition, alarming time that is set in advance in the watch-type terminal 200 is used as data for determining the wake-up state.

In addition, for example, when through the biological signal sensed through the watch-type terminal 200, it is recognized that a position of the user is moved from indoors to outdoors, information on the time (for example, 8:00) when a "indoors-to-outdoors movement" takes place and the change pattern of the biological signals at the time, for example, an individual index pattern 320 for the "indoors-to-outdoors movement," such as an extent of perspiration or an extent of a body temperature change, that is sensed, for example, through the GSR, are generated. In addition, surrounding environment information, for example, a change in an amount of light, a change in intensity of illumination, wind, temperature, humidity, and the like are used as additional information for recognize the indoors-to-outdoors movement.

In addition, the change pattern of the biological signals that are sensed while the watch-type terminal 200 is in a specific place, such as an "office," is generated as a personal index pattern 330 for the specific place. In addition, for example, when through the biological signals that are sensed through the watch-type terminal 200, it is sensed that the user does exercise, the change pattern of the biological signals that are sensed in this situation is a personal index pattern 340 for an individual that does exercise. At this time, time information on a period of time for which an "exercising state" continues, the change pattern of the biological signals that are generated while the "exercising" state continues, the change pattern of the biological signals that are generated after the "exercising" state ends, and the recovery time that the user takes to return to an normal state are detected together.

Similarly, the change pattern of the biological signals that are sensed after work is an individual index pattern 350 for the time (that is, private life after work) at which the user gets out of a specific place. When it is sensed through the biological signal that the user of the watch-type terminal 200 is in the "sleep state," the period of time for which the "sleep state" continues and the change pattern of the biological signals that are sensed while the "sleep state" is maintained are an index pattern 360 for the "sleep state."

In this manner, user life log information is acquired using the biological signals that are sensed through the watch-type terminal 200 for a reference period of time. That is, the user can recognize which change pattern the biological signals form while he/she does exercise or how the biological signals gradually change when the user comes close to the sleep state. Furthermore, the change pattern of the biological signals that are sensed while the user is in the excited state, the average time that the user takes to recover from the excited state, and the situational information that helps the user to return to a normal state each are set to differ from one user to another.

In addition, when the index patterns that are accumulated for a predetermined period of time, the watch-type terminal 200 recognizes an average life style of the user as an individual (for example, A gets up at between 6:00 and 6:30 and goes to bed at between 12:30 and 01:20) from the accumulated index patterns, and furthermore may sense a health disorder state that is not in accordance with the life style.

Figure 5A:
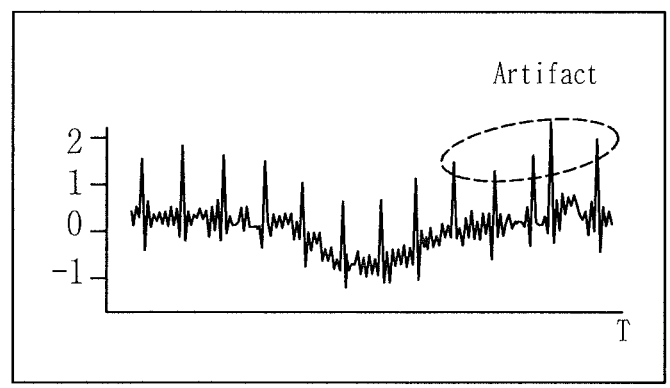
FIGS. 5A(a) and 5A(b) and 5B are graphs illustrating examples in which the index pattern relating to the state of the user is generated in the wearable device in according to the present invention.
Figure 5A:
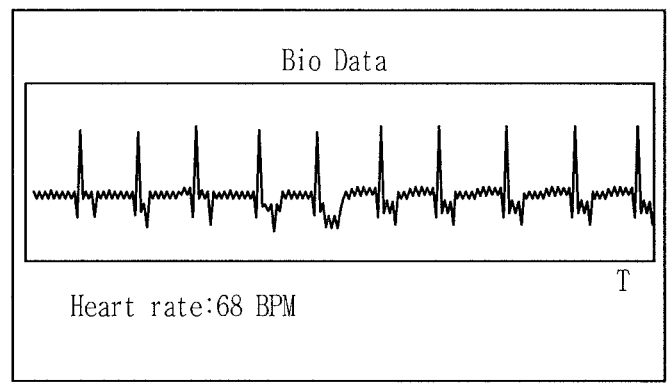

FIGS. 5A(a) and 5A(b) and 5B are graphs illustrating examples in which the index pattern relating to the state of the user is generated in the wearable device in according to the present invention.

FIG. 5A(a) illustrates a frequency and a waveform of the biological signal that is sensed through the watch-type terminal 200, or of the biological signal, for example, the ECG, which is received by the watch-type terminal 200 through a wireless communication unit 110. The illustrated graph from which an artifact is removed or a specific artifact (for example, an internal artifact) is extracted is used as a record of breathing rates of the user for recovering from the stress index, which is described below.

In addition, FIG. 5A(b) is a graph plotting a result of analyzing signal characteristics based on the sensed biological signals. For example, an R-peak R-peak Interval (R-R Interval (RRI)) of the electrocardiogram is analyzed as differing from one user to another. It is understood from the illustrated example that HRV is 68 BPM.

Figure 5B:
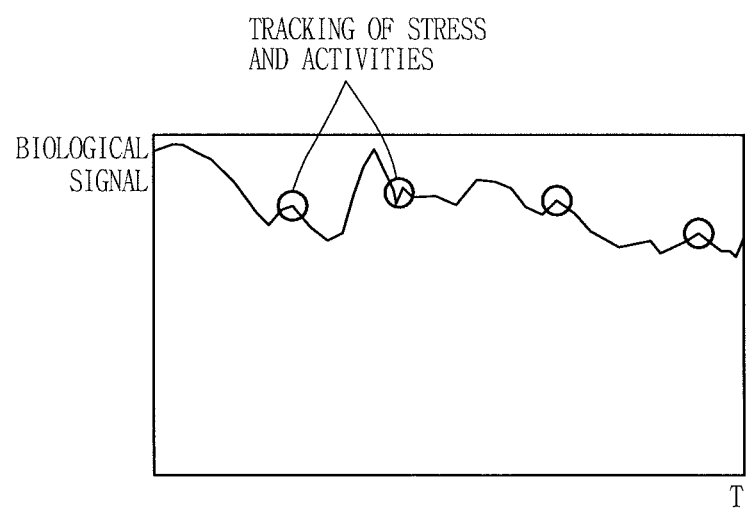

FIG. 5B illustrates an example in which various biological signals, for example, the ECG, the PPG, the GSR, the EMG, and the EEG are sensed for a reference period of time, and are expressed in one index pattern that changes over time. For example, through the index pattern that is formed by the biological signals from the user, the bedtime, the wake-up time, the average sleeping time, the average exercising time, the usual blood pressure, the usual heart rate, the usual body temperature, the usual pulse wave, the usual electrocardiogram, and the like are recognized for the user. Furthermore, an index ascending section of the stress index (or the drowsiness index) for the user and an index recovering section of the stress index for the user are recognized. Personalized features and patterns are extracted by tracking the stress index (or the drowsiness index) and information on a user's activity. In addition, information for helping the user to rapidly recover from when the stress index (or the drowsiness index) increases later is acquired by tracking the information on the user's activity or the operation by the terminal (for example, exercising, sleeping, a piece of reproduced music or content) at the points in time marked circles on the graph in FIG. 5B.

When the index pattern that is generated in this manner is stored in the storage unit 170, the controller 180 of the watch-type terminal 200 sets the reference driving index using the stored index pattern (S430).

At this point, the reference driving index, as described above, refers to the numerical value in the critical range, at which the stress index and the drowsiness index that are detected based on the biological signal of the user is suitable for the driver's safety driving. That is, the "reference driving index" means a minimum physical and emotional state that is required of a driver for the safety driving. For example, in a case where a driver is too excited or is more likely to doze off at the wheel, it is desirable that the driver should no longer drive in order to prevent a vehicle accident due to the negligence of the driver.

At this point, the stress index and the drowsiness index that correspond to the "reference driving index" is determined as a range of numerical values that represent the change pattern of the biological signals that are sensed through the watch-type terminal 200. For example, when the stress index (or the drowsiness index) ranges from 0 to 50, this is defined as "LOW." When the stress index (or the drowsiness index) ranges from 51 to 100, this is defined as "NORMAL." When the stress index (or the drowsiness index) exceeds 100, this is defined as "HIGH." In addition, in terms of the stress index (or the drowsiness index), the HIGH level of the stress index (or the drowsiness index) is subdivided into multiple levels, such as "somewhat dangerous," "dangerous," "highly dangerous." The "reference driving index" is set as a boundary value in the range of numerical values in which the stress index and the drowsiness index are below "HIGH."

On the other hand, as described above, the usual heart rate and the usual blood pressure each differ from one user to another. Furthermore, the change pattern of each of the blood pressure, the heart rate, the body temperature, the pulse wave, the electrocardiogram, and the like differ from one situation to another, or from one place to another place. Thus, according to the present invention, the "reference driving index" is relatively determined using the personal "index pattern" in which the "index pattern" differ from one user to another user.

For example, when an usual stress index for A is higher than the average stress index, it is desirable that the stress index corresponding to the "reference driving index" should be set to be higher than those for other persons. Specifically, in a case where the stress index exceeds 150, this is defined as "HIGH" for A, and the stress index for A, which corresponds to the "reference driving index," is set to "150."

In addition, for example, when B switches quickly to the "drowsiness" state in the condition of the same drowsiness index, it is desirable that the drowsiness index for B, which corresponds the "reference driving index," should be set to be lower than those for other persons. Specifically, in a case where the drowsiness index exceeds 70, this is defined as "HIGH" for B, and the drowsiness index for A, which corresponds to the "reference driving index" is set to "150."

The "reference driving index" is updated each time a change in the state of the driver is detected or the index pattern corresponding to a normal state of the driver who stays outside of the vehicle is changed. For example, in a case where the number of times that A is excited increases, or a period of time for which the excited state of A becomes longer, the current stress index corresponding to the "reference driving index" is updated with one that has a higher numerical value than the current stress index.

On the other hand, these steps have been all performed before the user gets in a vehicle. That is, the watch-type terminal 200 is said to have recognized a minimum state suitable for the safety driving before the user gets in the vehicle. Operations that the watch-type terminal performs after the user gets in the vehicle are described below. On the other hand, the following description assumes that the user who gets in a vehicle is a driver of the vehicle. However, because an object of the present invention is to alert a driver to a state of the driver before the driver starts to drive, terms "user" and "driver" are interchangeably used as described above.

When a user (or a driver) is sensed as getting in a vehicle, the controller 180 determines a current driving index corresponding to the biological signal of the user that is sensed before and after the user gets in the vehicle, with a predetermined reference driving index serving as a reference (S440).

It is sensed that the user gets in the vehicle, using various methods.

Specifically, it is sensed that the user gets on the vehicle, through a predetermined input signal, such as a predetermined touch input, a voice command, or a remote starting signal, that is applied to the watch-type terminal 200. In addition, it is sensed that the user gets in the vehicle, in a case where a gesture in which the user opens a door of the vehicle with his/her hand on which the watch-type terminal 200 is worn is sensed, it is sensed that the door is opened using a camera, a pressure sensor, or the like provided in the watch-type terminal 200, or an external force is applied to a touch sensor or a pressure sensor, or the like provided in a steering wheel of the vehicle. In addition, in a case where a vehicle starting sound is input through a microphone 222, it may be recognized that the user gets in the vehicle. In addition, in another example, when a telematics system installed within the vehicle is activated (turned on), it is sensed that the user gets in the vehicle.

When it is sensed in this manner that the user gets in the vehicle, the controller 180 of the watch-type terminal 200 calculates a current driving index corresponding to the biological signal that is sensed before and after the user gets in the vehicle, with the reference driving index stored in the storage unit 170 serving as a reference. The current driving index includes the stress index and the drowsiness index.

The controller 180 compares the index pattern of the biological signals sensed after the user gets in the vehicle with the index pattern corresponding to a predetermined reference driving index. As a result of the comparison, the controller 180 determines relative positions of the stress index and the drowsiness index that correspond to a current driving index, with respect to positions (hereinafter referred to as "reference points") of the stress index and the drowsiness index that correspond to the reference driving index.

At least one relative position among the stress index and the drowsiness index that correspond to the current driving index is higher than a reference point "0" (that is, a positive value ("+"), the controller 180 determines that the calculated current driving index is not suitable for allowing the user to drive the vehicle. On the other hand, both of the stress index and the drowsiness index that correspond to the current driving index is lower than the reference point "0" (that is, a negative value ("−"), the controller 180 determines that the calculated current driving index is suitable for the safety driving.

At this time, the controller 180 determines whether or not the current driving index is suitable for the safety driving, taking into consideration the change pattern of the biological signals that are sensed for a reference period of time after it is sensed that the user gets in the vehicle and the change pattern of the biological signals that are continuously sensed after the user gets in the vehicle.

For example, when the relative position of the stress index is higher than the reference point when the user gets in the vehicle, but is rapidly decreasing before and after the user gets in the vehicle (that is, is in the index recovering section), the controller 180 extends by a predetermined period of time the time at which the current driving index is determined, and calculates the current driving index. In addition, for example, when the relative position of the drowsiness index is lower than the reference point when the user gets in the vehicle, but is gradually increasing before and after the user gets in the vehicle (that is, ascending to a higher level), the controller 180 extends by a predetermined period of time the time at which the current driving index is to be determined, and thereafter calculates the current driving index. Here, a point in time when the current driving index will be calculated the predetermined period of time later is an arbitrary point of time before the vehicle drives a predetermined distance (for example, approximately 1 m) or greater after starting.

That is, the stress index and the drowsiness index that correspond to the current driving index are not fixed values and are values that change over time. Thus, the current state of the user can be determined with more precision by taking into consideration whether the stress index (or the drowsiness index), which is calculated based on the biological signals that are sensed before and after the user gets in the vehicle, is in the index ascending section or in the index recovering section.

To do this, when it is sensed that the user gets in the vehicle, the controller 180 calculates the current driving index in real time and visually displays the calculated current driving index on a touch screen 251.

For example, the controller 180 outputs the reference point corresponding to the reference driving index and the relative positions of the current driving index that is calculated in real time in the form of a graph to the touch screen 251, or outputs different images, which notify the user whether or not the user is in a state suitable for the safety driving, to the touch screen 251. At this time, both of the stress index and the drowsiness index that correspond to the current driving index may be displayed, and among the stress index and the drowsiness index, only the index pattern that exceeds the reference driving index may be displayed.

Next, the controller 180 outputs feedback that notifies the state of the user, which corresponds to the determined current driving index, (S450).

The state of the user, which corresponds to the current driving index, includes information indicating whether or not the user is in a state suitable for the safety driving and, when the user does not do so, information the reason that the user does not do so.

Specifically, in a case where the current driving index is not suitable for allowing the user to drive a vehicle, the controller 180 outputs feedback, such as a predetermined sound, a voice, vibration, a change in a screen displayed on the touch screen 251, or an LED color change. Then, through the feedback that is output, the user can recognize that his current state is not suitable for the safety driving and thus gets rest, listens to a piece of music, do deep breathing exercises or the like for himself before starting to drive.

In addition, the controller 180 outputs an alerting signal that alerts the user to the reason that the current driving index is not suitable for allowing the user to drive the vehicle. For example, in a case where it is determined that the drowsiness index corresponding to the current driving index ascends to a higher level, the controller 180 outputs a message saying "You are in a drowsy state. You are likely to doze off at the wheel. Drive after getting rest for a while" through the touch screen 251 or a sound output unit 252.

In addition, the controller 180 provides the user with the situational information, in such a manner that the current driving index becomes suitable for allowing the user to drive vehicle. At this point, the controller 180 provides the situational information that differs according to the reason that the current driving index is not suitable for allowing the user to drive the vehicle.

For example, in a case where the drowsiness index exceeds the reference driving index, the controller 180 recommends that the user should listen to a piece of music or audio content that helps to fight off drowsiness, among items of content that are stored in advance in the watch-type terminal 200 or that are downloaded from an external server. In addition, for example, in a case where the stress index exceeds the reference driving index, in order to lower the excited state of the user, the controller 180 recommend that the user should listen to a record of the breathing rates of the user, a record of the pulse of the user, and the like that are stored in advance in the watch-type terminal 200.

On the other hand, when it is determined that the current driving index is suitable for allowing the user to drive the vehicle, as described above, the controller 180 may not output feedback different in pattern from that described above, such as a predetermined sound, a voice, vibration, a change in a screen displayed on the touch screen 251, or an LED color change or may output no feedback.

In addition, in a case where the current driving index that is not suitable for the safety driving is changed to the driving index that is suitable for the safety driving or vice versa, the controller 180 outputs corresponding feedback in such a manner that the user can recognize this state change.

Figure 3B:
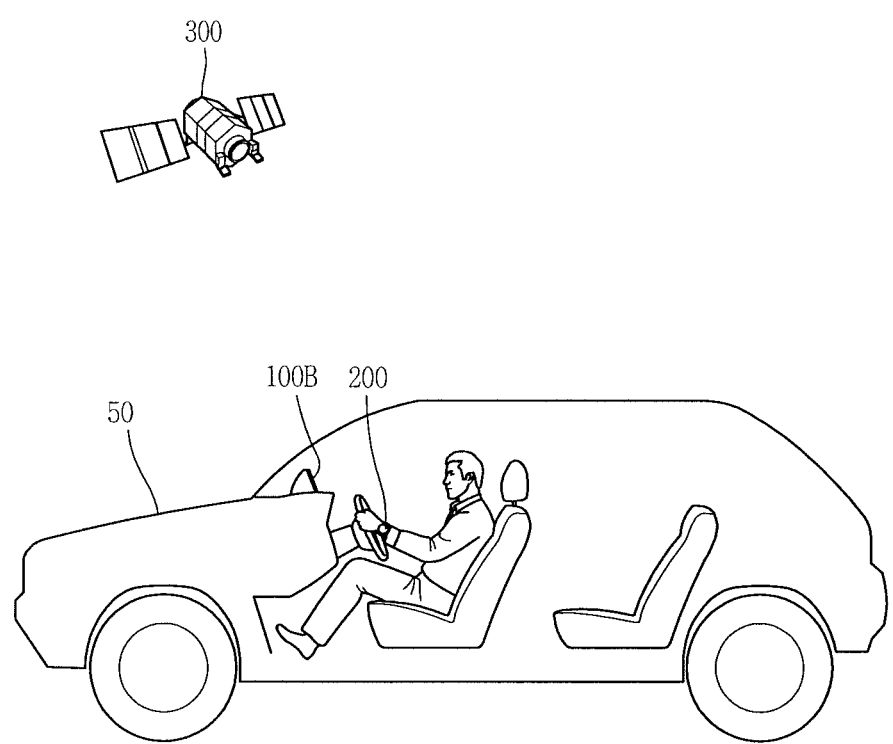
FIG. 3B is a diagram for describing a method of notifying the user of the state of the user in the wearable device according to the present invention when the user gets in a vehicle.

In this context, FIG. 3B is a diagram for describing a method in which the user is notified whether or not a state of the user is suitable for the safety driving, through the watch-type terminal 200 when the user gets in a vehicle.

As illustrated in FIG. 3B, when it is sensed that the user who wears the watch-type terminal 200 gets in a vehicle 50, before the user starts to drive, it is determined whether or not the current state of the user is suitable for the safety driving and thus feedback is output through the watch-type terminal 200.

At this time, the watch-type terminal 200 uses an usual index pattern for the user that is stored in advance in the watch-type terminal 200 and the reference driving index that is generate based on the usual index pattern, in determining whether or not the current state of the user is suitable for the safety driving. In addition, the watch-type terminal 200 uses the situational information (a history of the index patterns for the user in the corresponding place, for example, a history showing that the stress index always increases in the neighborhood of GANG-NAM station is referred to) corresponding to the positional information on the watch-type terminal 200 using a GPS 300, in determining whether or not the current state of the user is suitable for the safety driving. In addition, the watch-type terminal 200 determines whether or not the current state of the user is suitable for the safety driving by associating information on a path to a destination that is set in a terminal, for example, a telematics system 200B, installed within the vehicle 50, which displays a moving path to a destination, with the index pattern for the user (for example, when the user drives a long distance, he/she feels very tired).

When the current state of the user is determined in this manner, the watch-type terminal 200 outputs a message (for example, "You are in a drowsy state. Start to drive after getting rest, "You are in an excited state. Listen to a piece of music. Calm down and then start to drive") alerting the user to the current state through the watch-type terminal 200. On the other hand, as another example, the watch-type terminal 200 may perform control in such a manner that the information relating to the state of the user is output through the telematics system 200B, or may control operation (for example, "changing the current moving path to another (for example, a path along a forest). On the other hand, although not illustrated, after the user starts to drive, it is also continuously determined whether or not the state of the user is suitable for the safety driving.

As described above, according to the present invention, the user is notified in advance whether or not the current state of the user is suitable for the safety driving, using the pieces of biological information that have been sensed all the while, after the user gets in a vehicle but before the user starts to drive. This contributes to the safety driving, thereby more reliably preventing a vehicle accident due to driver's dozing-off at the wheel and the like.

Figure 6A:
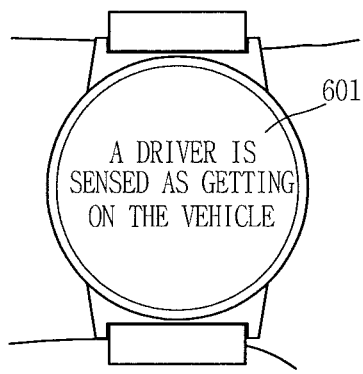
FIGS. 6A to 6C are diagrams for describing the flowchart in FIG. 4.
Figure 6B:
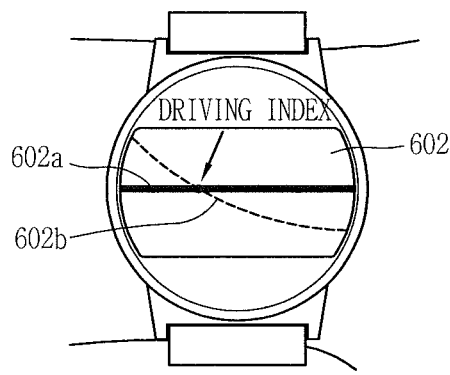
Figure 6C:
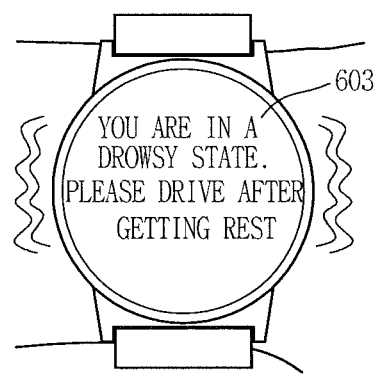

FIGS. 6A to 6C are diagrams illustrating a specific process in which the user is notified whether or not the state of the user is suitable for the safety driving, through the touch screen 251, when the user gets in a vehicle, using the index pattern and the reference driving index that are stored in advance in the watch-type terminal 200.

When the user who wears the watch-type terminal 200 gets in a vehicle, as illustrated in FIG. 6A, screen information notifying that the user gets in the vehicle, for example, a message 601 saying "A driver is sensed as getting in the vehicle," pops up on the touch screen 251 of the terminal.

At this point, as illustrated above, it is sensed that the user gets in the vehicle, through an input to the watch-type terminal 200, sensing of opening of a vehicle door, sensing of pressure to a steering wheel, receiving of a vehicle starting sound, activating of the telematics system installed within the vehicle or the like.

Then, the controller 180 calculates a current driving index in real time based on the biological signals that are sensed before and after the user gets on the vehicle, and on the personal index pattern and the reference driving index that are stored in advance in the watch-type terminal 200. The calculated current driving index, as illustrated in FIG. 6B, is output as a graph screen 602 including a reference line 602a indicating the reference driving index and a solid line 602b indicating the current driving index in real time.

At this time, as illustrated in FIG. 6B, when the solid line 602b indicating the current driving index in real time is moved farther and farther away from the reference line 602a to negative values below zero, the drowsiness index for the user is recognized as being in a "HIGH" state. On the other hand, in a case where the solid line 602b indicating the current driving index in real time is moved close to the reference line 602a or stays within a predetermined distance from the reference line 602a, the state of the user is recognized as being suitable for the safety driving. In addition, the solid line 602b indication the current driving index in real time is moved farther and farther away from the reference line 602a to positive values above zero, the stress index is recognized as being in a "HIGH" state.

Next, the watch-type terminal 200 outputs feedback, which notifies the user of the state of the user corresponding to the current driving index, to the touch screen 251. For example, as illustrated in FIG. 6C, a message 603, for example, saying "You are in a drowsy state. Drive after getting rest", in the form of visual information that notifies the user that the state of the user is not suitable for the safety driving or in the forms of visual information that recommends the situational information for changing the current state for the user, pops on the touch screen 251.

Along with this, vibration in an irregular pattern is output through a main body or a band of the touch screen 251, and this helps the user to fight off drowsiness. In this manner, according to the present invention, without being involved in driving a vehicle, the watch-type terminal 200 recommends or outputs the situational information for helping the user to be in the state suitable for the safety driving. Furthermore, for example, the watch-type terminal 200 outputs the vibration in the irregular pattern corresponding to the situation information.

Referring to FIGS. 7 to 13C, various examples are described in more detail below, in which feedback that notifies the user whether or not a state of the user is suitable for allowing the user to drive a vehicle is provided in the wearable device according to the present invention before starting to drive the vehicle.

Figure 7:
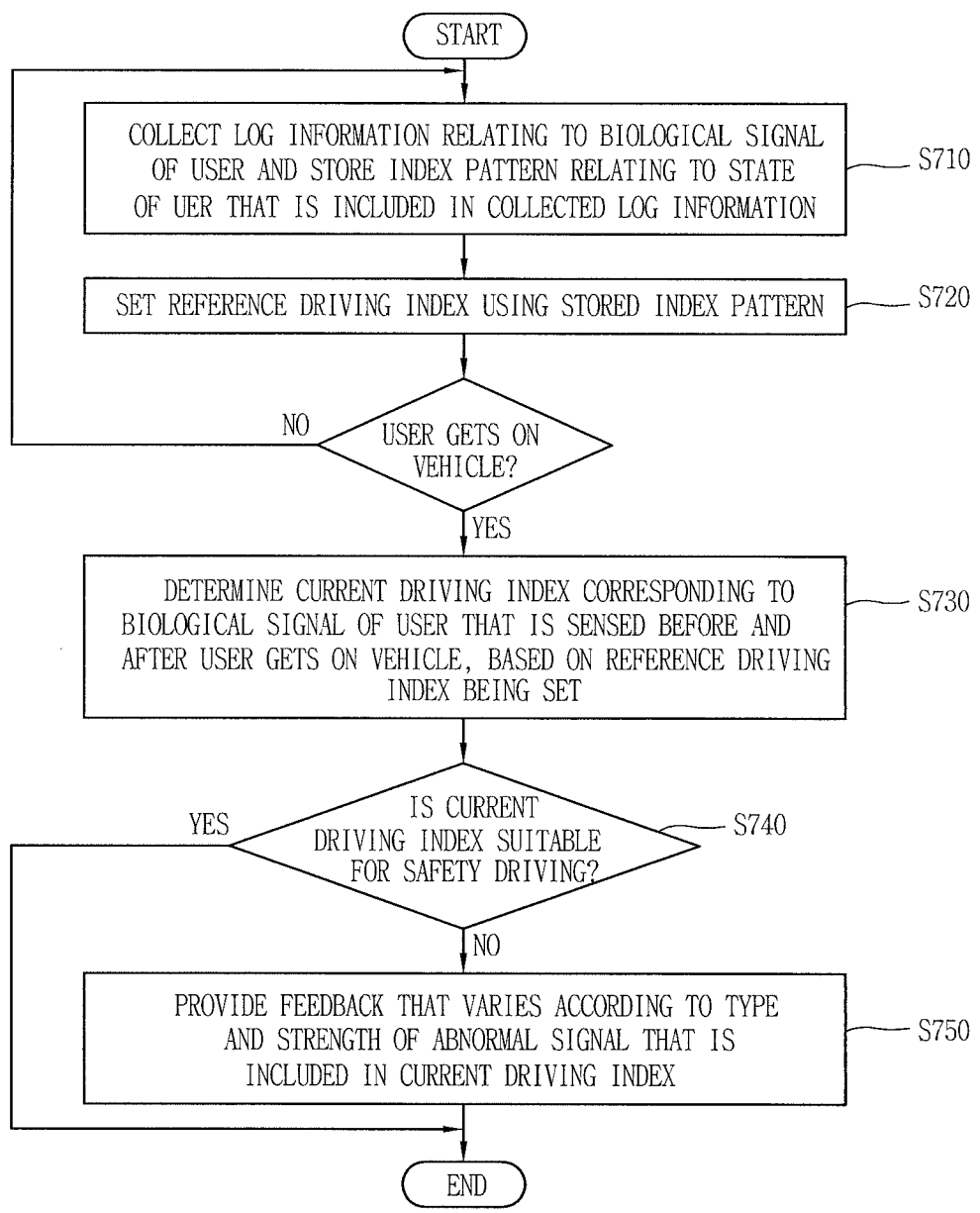
FIG. 7 is a flowchart for describing other examples in which feedback that notifies the user whether or not a current state of the user is suitable for allowing the user to drive the vehicle is provided in the wearable device according to the present invention before starting to drive the vehicle.

First, FIGS. 7 to 8(*c*) illustrate a method in which the feedback that varies according to at least one among a type and a size of the signal included in a current driving index is output in the watch-type terminal 200 according to according to the present invention.

Referring to FIG. 7, first, the biological signal of the user who wears the watch-type terminal 200 is sensed for a reference period of time and the log information relating to the biological signal of the user is collected. The pieces of "log information" are categorized by a current situation of the user, the time, and a place, and are accordingly collected.

Next, the controller 180 stores in the storage unit 170 the index pattern relating to the state of the user that is included in the collected log information which is collected in this manner (S710).

At this point, the "index pattern" relating to the state of the user means the biological signal corresponding to the state of the use or the change pattern of the biological signal that is acquired based on the sensed biological signal. The index pattern results from arranging the pulse, the breathing rate, the body temperature, the pulse wave, and the electrocardiogram of the user in an organized manner. The situational information (for example, the time, the position, or the information on the user's activity) corresponding to the index ascending section of the stress index and the situational information (for example, the recovery time, the place, the information on the user's activity or the operation by the terminal) corresponding to the index recovering section of the stress index are acquired by tracking the stress that the user feels, and thus are together stored.

When storing the "index pattern," the controller 180 divides the "index pattern into a physical index pattern and an emotional index pattern and stores the resulting physical and emotional index patterns.

Specifically, the controller 180 generates and stores the physical index pattern based on the biological signals of the user that are sensed for the same periods of time. For example, the change patterns of the biological signals that are sensed when the user wakes up and the change patterns of the biological signals that are sensed while the user does exercise are accumulated and are analyzed based on the sleep state of the user, the wake-up state of the user, and the extent of the user's activity in order to generate the physical index pattern. In addition, the controller 180 generates the emotional index pattern based on the change in the biological signal of the user that is sensed in a specific situation. For example, the change patterns of the biological signals that are sensed in a state where the user is stressful, relaxed, angry, tired, or drowsy are accumulated and analyzed in order to generate the emotional index pattern.

The physical index pattern and the emotional index pattern are personalized characteristics because blood pressure, a heart rate, a breathing rate, and the like each differ from one user to another in the same conditions of the time and the situation.

The controller 180 sets the reference driving index using that index pattern that is stored in this manner (S720). The "reference driving index" is updated each time the change in the state of the user is detected or the index pattern for the user is changed. In addition, the "reference driving index" is set to include multiple stages or levels in such a manner that a current state of the user is recognized with more precision.

When the user is sensed as getting in a vehicle, the controller 180 determines a current driving index corresponding to the biological signal of the user that is sensed before and after the user gets in the vehicle, with a predetermined reference driving index serving as a reference (S730).

As a result of the determination, if the current driving index is suitable for allowing the user to drive the vehicle (S740), no feedback is output. As a result of the determination, when the current driving index is not suitable for allowing the user to drive the vehicle, the feedback is provided that varies according to a type or strength of an abnormal signal that is included in the current driving index (S750).

Specifically, when it is determined that the current driving index is not suitable for allowing the user to drive the vehicle, the controller 180 outputs an alerting signal that alert the user to the current state of the user. At this time, the alerting signals include at least one or more among sound, vibration, light, and a screen change. At this case, the controller 180 performs control in such a manner that the type or the strength of the alerting signal varies according to the current state of the user.

For example, in a case where it is determined that the user is in the "excited state," exceeding the stress index corresponding to the reference driving index, the watch-type terminal 200 outputs vibration in an irregular pattern in such a manner that the user recognizes that the current state is not suitable for the safety driving. When, nevertheless, the user attempts to drive the vehicle or the extent to which the user is excited increases, strength of vibration and vibration intervals are adjusted to be increased or a guide voice message (for example, saying "You are too excited. Please wait a short time before starting to drive") is further output along with the vibration. On the other hand, when the extent to which the user is excited decreases, the alerting signal is no longer output, and feedback that notifying the user that the state of the user is suitable for the safety driving is output.

On the other hand, in a case where as the result of determining the current driving index, the state of the user is not suitable for the safety driving, the controller 180 also outputs a message asking for a user's opinion on the determined state through the touch screen 251 or the sound output unit 252. Then, the user sees the message being output and inputs a response notifying whether or not his/her state actually agrees with the current driving index. Then, the controller 180 outputs feedback based on the user's response to the message. For example, in a case where the watch-type terminal 200 determines that the user is in the "drowsy state" that is not suitable for the safety driving and thus outputs the message asking for the driver's confirming of the determined state and the user replies with "NO," the watch-type terminal 200 no longer output the message and monitors the drowsiness index for a reference period of time.

In addition, the controller 180 reflects the user's response to the message in a predetermined reference driving index. For example, in a case where the watch-type terminal 200 determines that the user is in the "excited state" that is not suitable for the safety driving and thus outputs the message asking for the driver's confirming of the determined state and the user replies with "NO," the watch-type terminal 200 adjusts the stress index corresponding to the predetermined reference driving index in a manner that increases the stress index. On the other hand, in a case where the user replies with "YES," as a response to the message, the watch-type terminal 200 recommends the situational information (for example, listening to a piece of music, taking a deep breath) that helps the user to rapidly recover from the "excited" state.

On the other hand, the controller 180 continuously monitors the state of the user also after the feedback that notifies the user of the state of the user corresponding to the current driving index, and provides feedback corresponding to a result of the monitoring. At this point, the feedback is changed according to whether or not the state of the user is changed to a state suitable for the safety driving as a result of the monitoring or according to whether or not the state of the user that is not suitable for the safety driving continues or deteriorates.

Figure 8A:
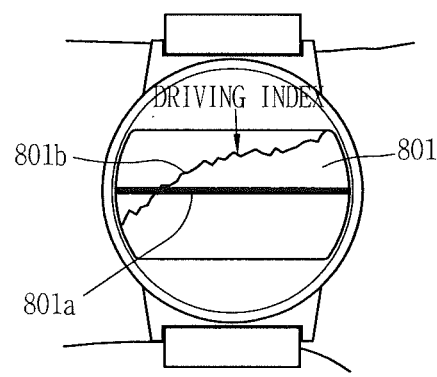
FIGS. 8A to 10B(c) are diagrams for describing other examples in which the feedback that notifies the user whether or not the current state of the user is suitable for allowing the user to drive the vehicle is provided in the wearable device according to the present invention before starting to drive the vehicle.

For example, it is understood from FIG. 8A that after the user gets in a vehicle, graph information 801 indicating that a current driving index 801b exceeds the stress index corresponding to a reference driving index 801a is output through the touch screen 251 of the watch-type terminal 200. Here, an example in which the current driving index is output in the form of a graph is illustrated, but the driving index is not limited to this. The current driving index is displayed in the form of a number, a diagram, an image, and the like in such a manner that the current driving index is in contrast with the reference driving index.

Figure 8B:
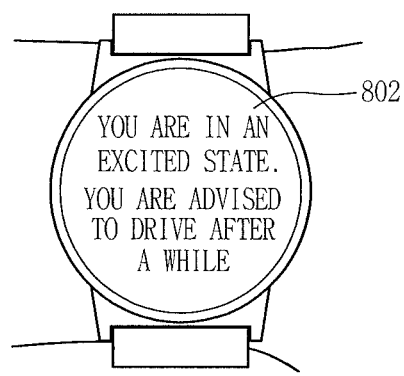
Figure 8C:
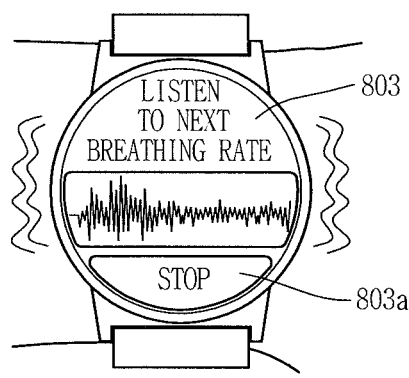

Next, as illustrated in FIG. 8B, a message 802 that indicates the state of the user corresponding to the current driving index, for example, saying "You are in the 'excited state.' You are advised to drive after a while," pops up on the touch screen 251.

On the other hand, when after the message 802 is output, the user does not recover from the "excited state" even after a reference period of time (for example, one minute), it is sensed that the user attempts to drive a vehicle, or an increase in the extent to which the user is excited is monitored, the controller 180 provides the situational information that helps the user to recover from the excited state. As an example of this, in FIG. 8C, a portion corresponding to the breathing rate of the user is extracted from the index pattern that is stored in advance in the watch-type terminal 200 and the extracted portion is converted into sound and is output through the sound output unit 252. Along with this, screen information visually indicating the breathing rate of the user and guide information 803 are output to the touch screen 251. The user can listen to his/her breathing rate in the audio form, and this helps the user to rapidly recover from the excited state. When a touch is applied to a "stop" key 803a that is output to the touch screen 251, the breathing rate of the user is no longer output.

As described above, the current driving index is determined based on the reference driving index that is set based on the usual physical index pattern and usual emotional index pattern for the user and on the biological signal that is sensed after the user gets in the vehicle. However, the stress index corresponding to the current driving index is measured at a higher level than in ordinary days, according to a user's movement and activity immediately before the user gets in the vehicle, such as when the user does strenuous exercise before the user gets in the vehicle or when the user runs to the vehicle.

An example in which information on an activity that is done before the user gets in the vehicle is recognized in the watch-type terminal 200 according to the present invention in order to determine the current driving index in more precision is described below referring to FIGS. 9A to 11.

First, before the user gets in a vehicle, a personal index pattern is generated using the log information that is collected based on the biological signals of the user, for example, such as the ECG, the EMG, the EEG, the HRV, and the PPG, that are sensed for a reference period of time, and the reference driving index that is set using the index pattern is stored in advance in the watch-type terminal 200.

Figure 11:
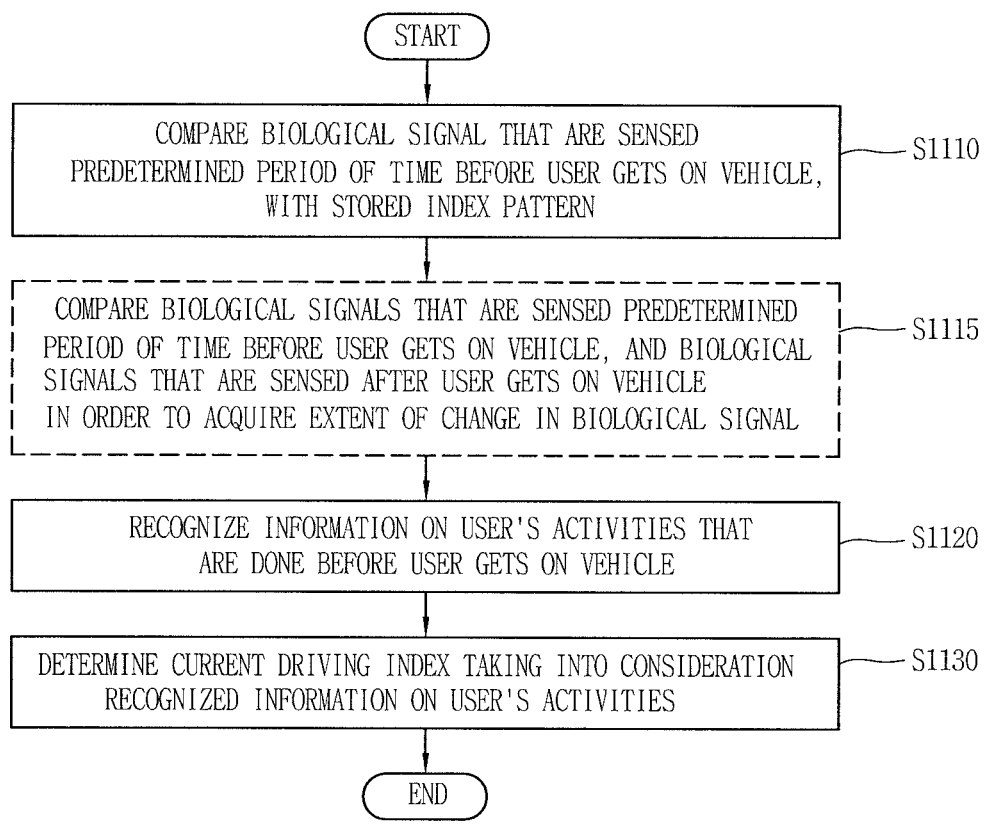
FIGS. 11 and 12 are flowcharts for describing other examples in which the feedback that notifies the user whether or not the current state of the user is suitable for allowing the user to drive the vehicle is provided in the wearable device according to the present invention before starting to drive the vehicle.

When it is sensed that the user gets in the vehicle, as illustrated in FIG. 11, first, the biological signals that are sensed for a predetermined period of time before the user gets in the vehicle are compared with the index pattern that is stored in advance (S1110).

At this point, as illustrated above, the time when it is sensed that the user gets in the vehicle corresponds to any one among the input to the watch-type terminal 200, the sensing through a sensor provided to the watch-type terminal 200, the opening of a vehicle door, the sensing of pressure to a steering wheel of the vehicle (in a case where the sensor is attached to the steering wheel), the outputting of vehicle starting sound, the activating of a telematics system, and the like. In any case, the time when it is sensed that the user gets in the vehicle is limited to the time before starting to drive the vehicle.

In addition, at this point, the index pattern that is stored in advance means the physical index pattern, for example, the change pattern of the usual biological signals of the user or the change pattern of the biological signals corresponding to wake-up, movement, exercise and the like. That is, the index pattern means the changes in the biological signals corresponding to the information on the user's activity except for the emotional index pattern that is stored in advance.

In addition, at this point, the predetermined period of time before the user gets in the vehicle means a time length between an arbitrary point of time before it is sensed that the user gets in the vehicle and a point in time when it is sensed that the user gets in the vehicle. The predetermined period of time is determined in a manner that differs according to the extent to which the predetermined period of time is matched to the usual index pattern for the user. For example, when the change pattern of the biological signals that was sensed until this morning does not greatly deviate from the index pattern that is stored in advance, but the biological signals that was sensed after two o'clock in the afternoon greatly deviates from the index pattern that is stored in advance, the watch-type terminal 200 collects the biological signals as effective data from the time when this change was sensed. The biological signals collected as the effective data are used in analyzing the information on the user's activity, as described below. Thereafter, when in a state where it is not sensed that the user gets in the vehicle, the change pattern of the biological signal of the user becomes the same as or similar to the index pattern that is stored in advance, the watch-type terminal 200 ignores the data that was collected before or records the data and additionally determines an arbitrary period of time corresponding to the predetermined period of time before the user gets in the vehicle.

In this manner, in order to recognize the change pattern of the biological signals of the user at the arbitrary point of time before the user gets in the vehicle, it is required that the watch-type terminal 200 according to the present invention be worn on a specific portion of the user's body before the user gets in the vehicle, thereby continuously sensing the biological signals of the user.

On the other hand, the controller 180 applies the physical index pattern that is adjusted according to a user's health state when performing comparison. For example, in a case where the biological signals in a different pattern from the usual index pattern is continuously sensed from the time when the user wakes up, the watch-type terminal 200 determines that the user is in poor health, and performs the comparison by temporarily the physical index pattern that is stored in advance (for example, increases or decreases, by a predetermined amount, all numerical values of the pulse and the breathing rate corresponding to the index pattern that is stored in advance).

Optionally, in addition to step S1110, in order to acquire the extent of the change in the biological signal, the controller 180 compares the biological signals that are sensed for a predetermined period of time before the user gets in the vehicle and the biological signals that are sensed after the user gets in the vehicle (S1115). By performing the comparison (S1110, or S1110 and S1115), the controller 180 recognizes the information on the user's activity that is done before the user gets in the vehicle (S1120).

For example, when an arterial blood volume regularly increases or decreases in the PPG signal, it is determined that the stress index is high. The information on the user's activity that is done before the user gets in the vehicle is estimated by checking whether or not the PPG signals are more gradually and more irregularly changed when sensed at a specific point of time before the user gets in the vehicle than when sensed after the user gets in the vehicle or by checking whether or not the PPG signals are more rapidly or more slowly changed when sensed at the specific point of time before the user gets in the vehicle than when sensed after the user gets in the vehicle. In a case where the PPG signals are changed more rapidly and more irregularly when sensed after the user gets in the vehicle than when sensed at the specific point of time before the user gets in the vehicle, it is determined that the user "did exercise or ran" immediately before the user gets in the vehicle.

At this time, the controller 180 outputs a message asking for the user's confirming of the recognized information on the user's activity.

Next, the controller 180 determines a current driving index for the user taking into consideration the recognized information on the user's activity (S1130).

For example, as illustrated above, in a case where it is determined that the user "did exercise or ran" immediately before the user gets in the vehicle, the stress index corresponding to the current driving index for the user is output that has a lower value than was actually measured or a value of the stress index corresponding to the reference driving index is increased more than a predetermined value. In this manner, the current driving index is determined. Specifically, the stress index corresponding to the current driving index is high in terms of an absolute value, but this is due to the user's activity that is done immediately before the user gets in the vehicle, and the stress index naturally returns to a usual level. As a result, the controller 180 determines that the state of the user is suitable for the safety driving. In this case, the controller 180 provides the determined current driving index along with the absolute value (that is, the stress index corresponding to the current driving index).

Figure 9A:
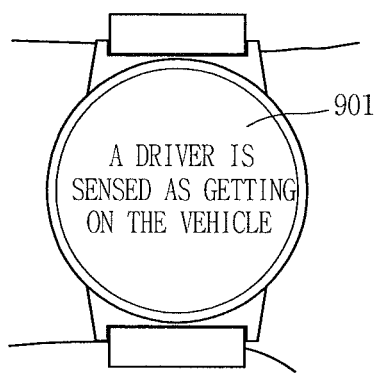
Figure 9B:
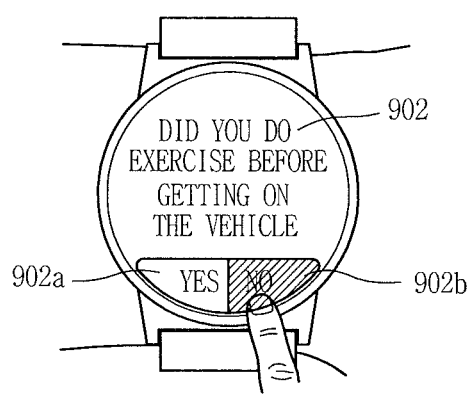
Figure 9C:

Referring to FIGS. 9A to 9C, when it is sensed that the user gets in the vehicle, as illustrated in FIG. 9A, a message 901 saying "A driver is sensed as getting in the vehicle" pops up on the touch screen 251 of the watch-type terminal 200.

When the user gets in the vehicle in this manner, the controller 180 performs Steps S1110, S1115, and S1120 of recognizing the information on the user's activity that is done before the user gets in the vehicle, which are described referring to FIG. 11, and outputs visual information asking for the user's confirming of the recognized information, for example, a message 902 saying "Did you do exercise before getting in the vehicle? "When the user selects "YES" 902a, the information on the user's activity that is done immediately before the user gets in the vehicle is reflected and thus the current driving index is determined. On the other hand, as illustrated in FIG. 9B, when the user selects "NO" 902b, only the biological signals that are sensed after the user gets in the vehicle is compared with the reference driving index that is stored in advance, and thus the current driving index is determined. As a result, as illustrated in FIG. 9C, the stress index corresponding to the current driving index exceeds the reference driving index, and visual information that alerts the user that the current state is not suitable for the safety driving, for example, a message 903 saying "You are in an excited state. This state is not suitable for safety driving" pops up the touch screen 251. On the other hand, although not illustrated, the visual information that alerts the user that the state of the user is not suitable for the safety driving may be displayed along with a predetermined image (for example, a tearful-face expression).

On the other hand, according to the present invention, in a case where the state of the user is not suitable for the safety driving, the suitable situational information that helps the user to rapidly return to the state suitable for the safety driving is recommended through the watch-type terminal 200.

Figure 10A:
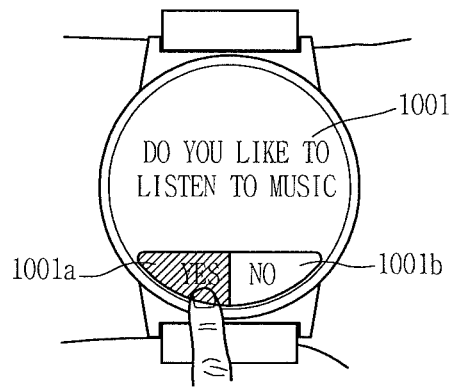
Figure 10A:
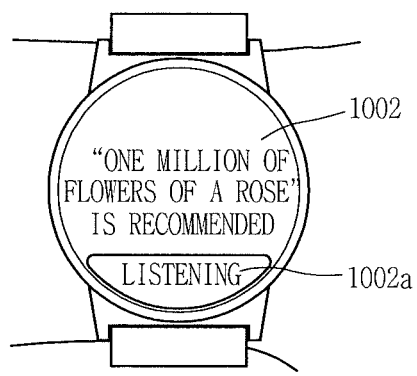
Figure 10A:
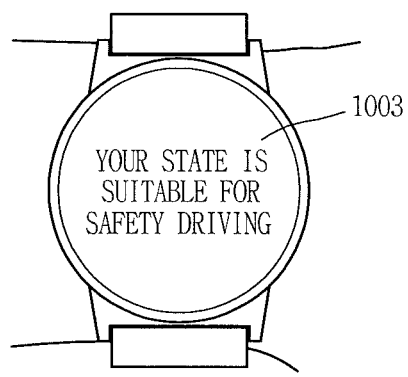

In this context, FIGS. 10A(a) to 10B(c) illustrate methods in which items of content that help the user to fight off drowsiness or to relieve stress are recommend or provided through the analyzing of the index pattern that is stored in advance in the watch-type terminal 200.

According to the present invention, each of the reference driving index that is stored in advance in the watch-type terminal 200, and the current driving index that is calculated after the user gets in the vehicle includes the stress index and the drowsiness index. Then, each of the stress index and the drowsiness index that is continuously sensed for a predetermined period of time includes the index ascending section and the index recovering section.

The index ascending section is a section on the graph in which the stress index (or the drowsiness index) ascends. When a slope is steep, this means that the stress rapidly ascends. When the slope is gentle, this means that the stress slowly ascends. The index recovering section is a section on the graph in which the stress index (or the drowsiness index) at a high level descends. When a slope is steep, this means that the stress is rapidly relieved. When the slope is gentle, this means that the stress is slowly relieved. On the other hand, here, the stress index and the drowsiness index are together described for the purpose of avoiding the redundant description, but generally, when the stress index increases, the pulse, the breathing rate, and the heart rate increase greatly than those in the index pattern that is stored in advance. When the drowsiness index increased, generally, the pulse, the breathing rate, and the heart rate decrease greatly than those in the index pattern that is stored in advance. These facts are reflected to generate a graph.

On the other hand, in a case where the current driving index that is determined after the user gets in the vehicle is not suitable for allowing the user to drive the vehicle, the controller 180 of the watch-type terminal 200 detects the log information relating to a situation that is recorded in the index recovering section corresponding to the current state of the user. To do this, the controller 180 extracts the log information relating to a section in which the stress index at a high level descends, from the biological signals that are sensed outside of the vehicle, and stored the extracted log information. The pieces of log information relating to such a situation, for example, include not only operations by the terminal, such as when the user reproduces a piece of specific music in the section in which the stress index at a high level descends in the watch-type terminal 200, but also the user's activity, such as when the user does exercise in the section in which the stress index at a high level descends.

Thereafter, the controller 180 outputs feedback that helps to create a situation corresponding to the detected log information, through the touch screen 251 or the sound output unit 252.

For example, referring to FIG. 10A(a), in a case where after the user gets in the vehicle, it is determined that the state of the user is not suitable for allowing the user to drive the vehicle, screen information that recommends "listening to a pieces of music" for the user is output through the touch screen 251 of the watch-type terminal 200. In a case where the user selects "YES" 1001a, as illustrated in FIG. 10A(b), the controller 180 outputs screen information 1002 to the touch screen 251. The screen information 1002 recommends a piece of music content that is reproduced in a section in which the stress index descended in the index pattern that is stored in advance, or a piece of music content (for example, a song titled "one million of flowers of a rose") which the user listened to the most and thus is familiar with.

At this time, the controller 180 adjusts a tempo (fast or slowly) of a piece of music that is reproduced, based on the biological signal of the user that is currently sensed. For example, in a case where the stress index for the user is high, the controller 180 reproduces a piece of music with the same beat as that of the breathing rate of the user which is predicted from the artifact of the PPG.

On the other hand, when the state of the user is changed to a state suitable for the safety driving, as illustrated in FIG. 10A(c), a message 1003 saying that the state of the user is suitable for the safety driving pops up on the touch screen 251. Then, the controller 180 learns this series of change patterns, that is, the time the state of the user takes to change, the change patterns of the stress index and the drowsiness index. Alternatively, the controller 180 organizes the series of change patterns for convenient access and stores the organized series of change patterns in the database. Thus, the series of change patterns are reflected in a predetermined reference driving index.

In addition, in a case where it is determined that the current driving index that is measured after the user gets in the vehicle is not suitable for allowing the user to drive the vehicle, the controller 180 performs control in such a manner as to detect the log information relating to the situation that is recorded in a case where the index recovering section corresponding to the current state of the user is the shortest.

At this point, the shortest index recovering section corresponding to the current state of the user refers to an index recovering section that has a point at which at least the current stress index (or drowsiness index) and the numerical value are the same is present, and that has the steepest slope, among the index recovering sections corresponding to at least one index pattern detected in the watch-type terminal 200, which has a change pattern similar to the change pattern of the current stress index. This means that in such a section, the stress is relieved in a fast, efficient way. Thus, in a case where the log information relating to the situation in this section is detected and is provided to the user, the stress is relieved in a fast, efficient way and the state of the user becomes suitable for allowing the user to drive the vehicle.

In addition, in a case where the current driving index that is determined after the user gets in the vehicle is not suitable for allowing the user to drive the vehicle, the controller 180 outputs feedback that helps the current driving index of the user to decrease more than the stress index and the drowsiness index corresponding to the reference driving index, using the biological signal of the user that is recorded in the index recovering section corresponding to the current state of the user and using external context information.

At this point, the pieces of external context information include various pieces of preference information on pieces of music, places, foods, and the like that the user of the watch-type terminal 200 prefers, pieces of information that are obtainable through an external server (not illustrated) and that many people who have the life log information similar to that of the user prefer, and pieces of environmental information on news, weather, and the like. The external context information is input into or received by the watch-type terminal 200 through a user input, or is acquired from a server that is connected by executing an application for conjunctional operation with the server.

Figure 10B:
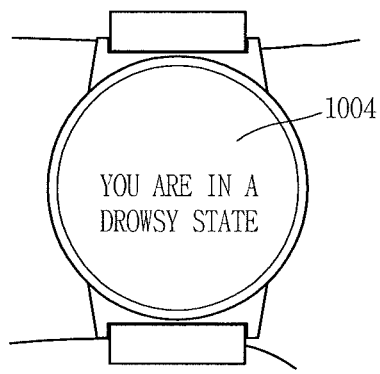
Figure 10B:
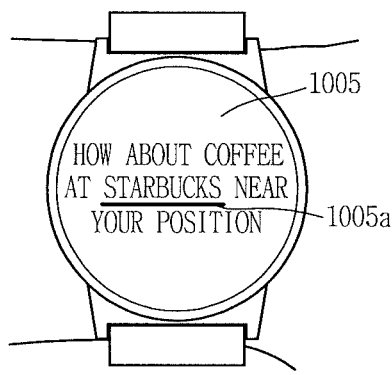
Figure 10B:
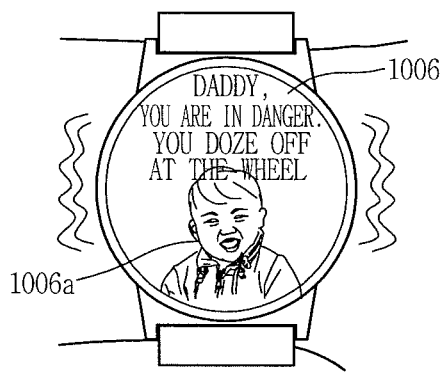

For example, as illustrated in FIG. 10B(a), the watch-type terminal 200 outputs feedback that notifies the user of the state of the user that is determined after the user gets in the vehicle, for example, a message 1004 saying "You are in a drowsy state" through the touch screen 251. Then, the suitable situational information is provided in such a manner that the state of the user is changed to a state suitable for the safety driving. For example, as illustrated in FIG. 10B(a) to 10B(c), visual information 1005 is output to the touch screen 251. The visual information guides the user to a specific coffee ship that is closest to the current position of the watch-type terminal 200 using a GPS. At this time, the specific coffee shop is matched to a place that the user frequently goes to, or likes, or to place that is recorded in the index recovering section in the drowsiness index for the user and thus is recommended for the user. At this time, when the user applies a touch to text 1005a indicating a specific coffee shop on the visual information 1005, the visual information 1005 being output is changed to map information (not illustrated) that guides the user to the selected specific coffee ship ("STARBUCKS").

On the other hand, the controller 180 also continuously monitors the biological signal of the user and a state change corresponding to the biological signal after the feedback that notifies the user of the state of the user corresponding to the current driving index is output one time. Accordingly, when it is sensed that the user attempts to drive the vehicle in a state where the state of the user deteriorates or is not suitable for safe driving, feedback at a higher alerting level is output. As an example of this, as illustrated in FIG. 10B(c), vibration in an irregular pattern is output to the watch-type terminal 200, and an alerting message 1006 saying "Daddy, You are in danger! You doze off at the wheel" is output to the touch screen 251. In addition, although not illustrated, an expression image (for example, the worse the state of the user, the more tearful face the expression image wears, and when the state of the user is suitable for the safety driving, the expression image wears a smiling face) that corresponds to the biological signal of the user and the state change corresponding to the biological signal is output to the touch screen 251.

As described above, according to the present invention, in a case where it is determined that the current state of the user is not suitable for the safety driving, the suitable situational information is provided using the pattern of the biological signals that are stored in advance, in such a manner that the user rapidly returns to the state suitable for the safety driving. Furthermore, the current state of the driver is determined with more precision in checking the current state of the driver, by tracking and reflecting the information on the user's activity that is done before the user gets in the vehicle.

Figure 12:
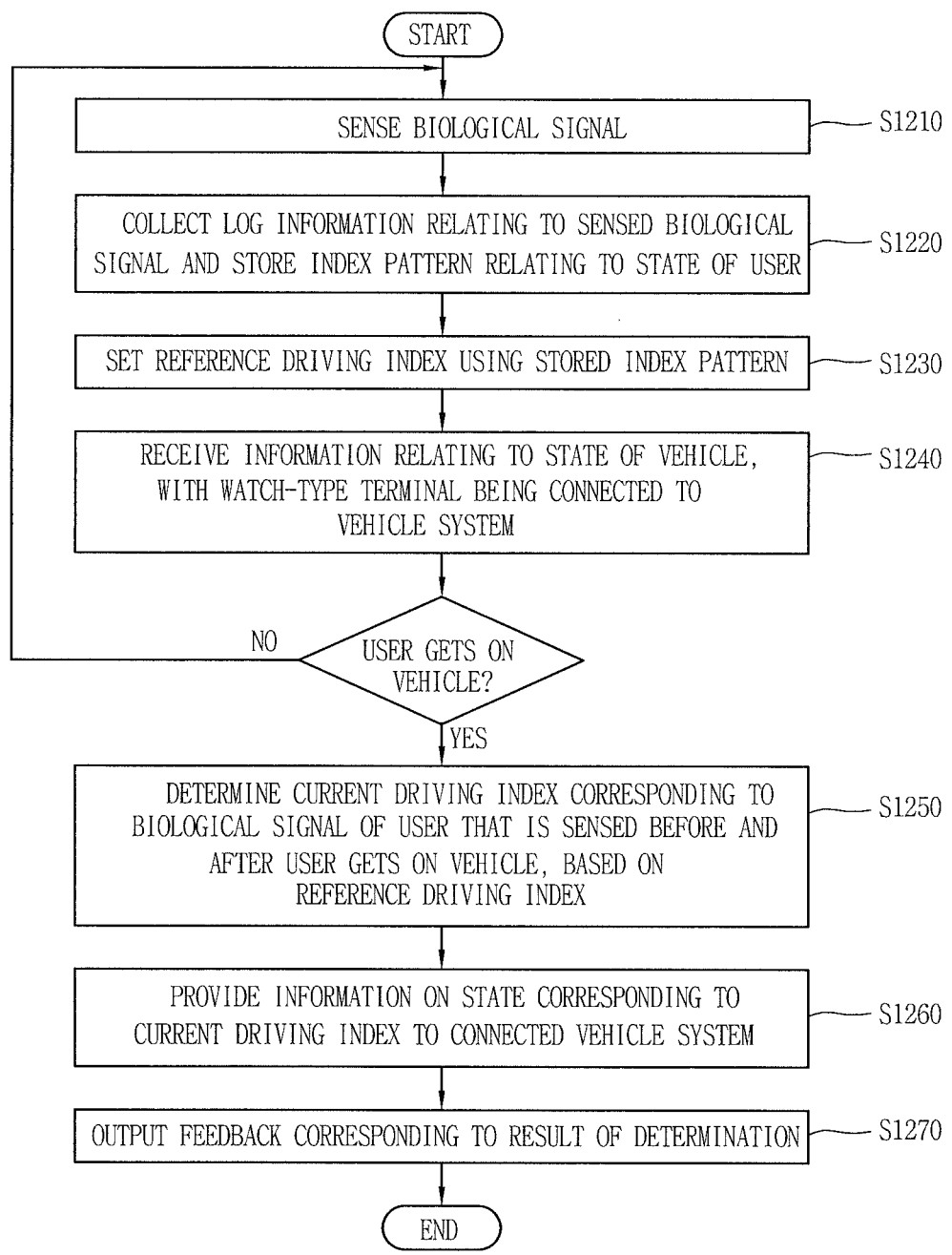
Figure 13A:
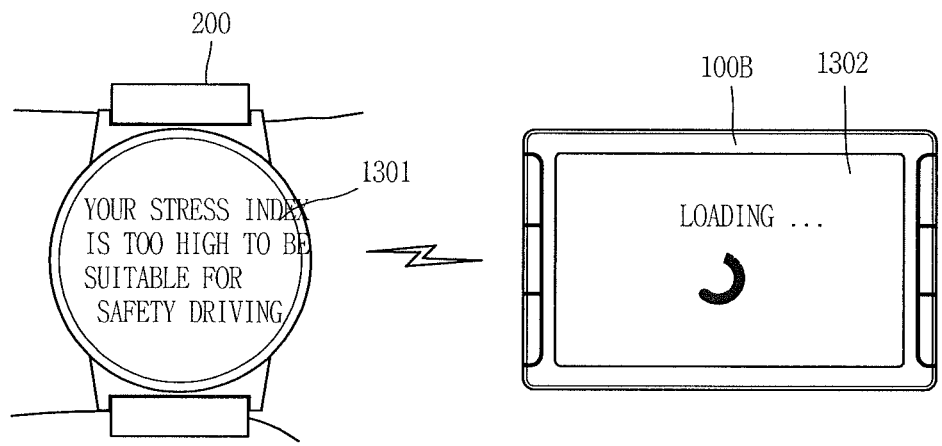
FIGS. 13A to 13C are diagrams for describing an example in which the feedback that notifies the user whether or not the current state of the user is suitable for allowing the user to drive the vehicle is provided in the wearable device according to the present invention before starting to drive the vehicle.
Figure 13B:
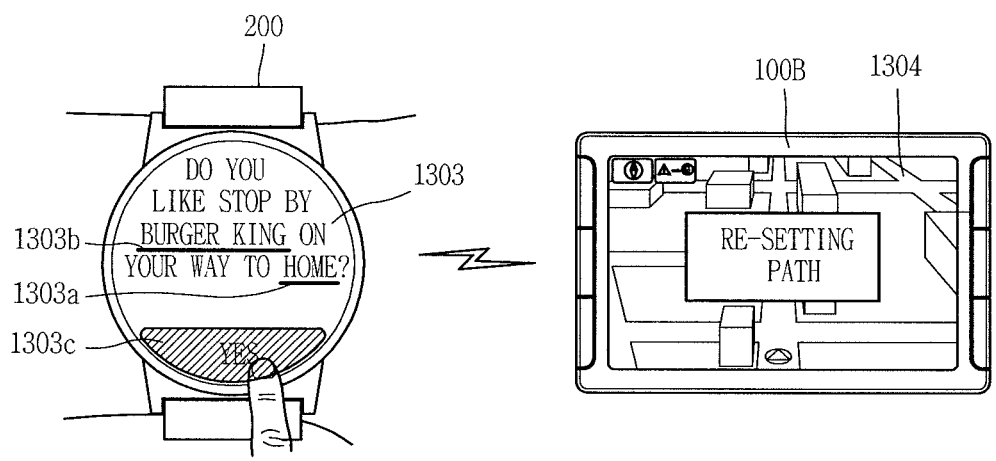
Figure 13C:
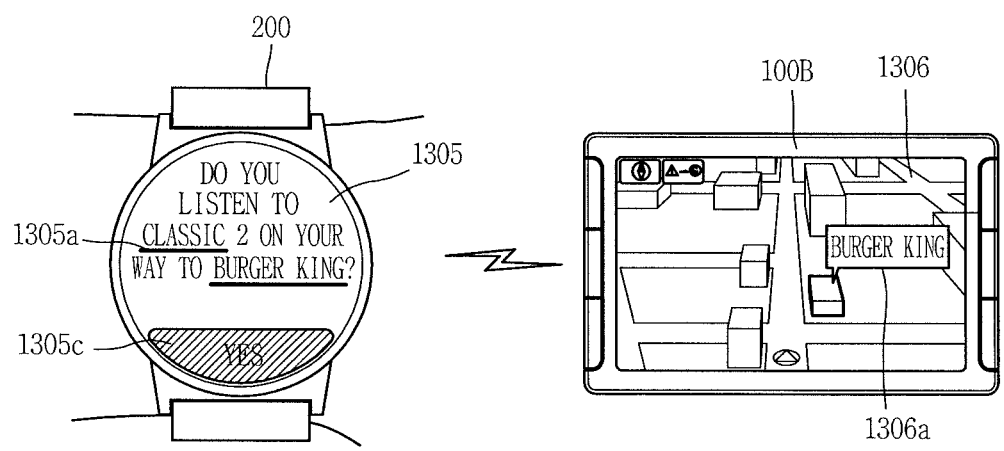

FIGS. 12 to 13C illustrate methods in which the watch-type terminal operates in conjunction with a vehicle system or a telematics system installed within the vehicle in order to output feedback associated with the state of the user is output.

Referring to FIG. 12, the biological signal of the user who wears the watch-type terminal 200 is sensed for a reference period of time (S1210). The log information relating to the sensed biological signal is collected, and the index pattern relating to the state of the user is generated and is stored (S1220). Then, the reference driving index is set using the stored index pattern (S1230). In Steps S1210 to S1230, the operation by the watch-type terminal 200 involves the use of the biological signals that are sensed in ordinary days before the user gets in the vehicle.

Next, when it is sensed that the watch-type terminal 200 comes into proximity with the vehicle (for example, within 5 m from the vehicle), the watch-type terminal 200 is connected to the vehicle system (for example, an OBD system, a telematics system, or a head-up display (HUD)) and receives related information from the vehicle system (S1240). In order to receive information relating to a state of the vehicle, the watch-type terminal 200 performs wireless communication with the vehicle system using Bluetooth, ZigBee, WiFi and the like, or performs wired communication with the vehicle using RS-232, RS-485, USB, CAN, and the like.

When, based on the received information, it is sensed that the user gets in the vehicle, the watch-type terminal 200 determines a current driving index corresponding to the biological signal of the user that is sensed before and after the user gets in the vehicle, with a predetermined reference driving index serving as a reference (S1250). At this point, the pieces of information relating to the state of the vehicle include, for example, signals associated with opening of a vehicle door, starting of the vehicle, and operation of the telematics system or the HUD.

Next, the watch-type terminal 200 provides information on the state of the user corresponding to the determined current driving index to the connected system (S1260). Specifically, the controller 180 of the watch-type terminal 200 notifies the vehicle system whether or not the current state of the user is suitable for the safety driving. If the current state does not do so, the controller 180 notifies the vehicle system of the reason that the current state does not do so.

Then the vehicle system analyzes a sensor value that is sensed by at least one sensor or more, for example, sensors that are attached to a camera within the vehicle, and to a steering wheel, and checks the information on the state of the user that is determined by the watch-type terminal 200. A result of the checking is transmitted back to the watch-type terminal 200 and is reflected in determining the current driving index for the user.

Then, the watch-type terminal 200 outputs feedback that notifies the user of the state of the user that corresponds to the current driving index (S1270), or performs control to operate the vehicle system based on the state of the user corresponding to the current driving index.

Specifically, according to the information on the state of the user corresponding to the current driving index, the controller 180 provides a control signal for changing a destination or a moving path that is set in advance in the vehicle system, through the wireless communication unit 110.

For example, referring to FIGS. 13A to 13C, when the telematics system installed within the vehicle, for example, a navigation apparatus 100B is turned on (1302), the watch-type terminal 200 connected to the navigation apparatus 100B determines that the user gets in the vehicle, senses the biological signals of the user, and calculates the current driving index based on a predetermined reference driving index. As a result, as illustrated in FIG. 13A, visual information that notifies the user of the state of the user that corresponds to the calculated current driving index, for example, a message 1301 saying "Your stress index is too high to be suitable for safety driving" is output to arouse user' attention to the safety driving.

Next, the situational information that lowers the stress index to a usual level is extracted using the index pattern that is stored in advance in the watch-type terminal 200. At this time, the extracted situational information is provided in conjunction with information that is set in the navigation apparatus 100B. For example, in a case where in FIG. 13B, a destination that is set in the navigation apparatus 100B is "HOME" and the pieces of situational information that lower the stress index to the usual level, which are stored in the watch-type terminal 200, are "HUNGRY," "EATING HAMBURGAR," visual information 1303 that recommends a situation change for the user, for example, a message saying "Do you stop by 'Burger King' on your way to 'home'?" is output to the touch screen 251 of the watch-type terminal 200.

At this time, when the user selects "YES" 1303c, the watch-type terminal 200 transmits a control signal for re-setting the path, which causes "Burger King" to be included in the moving path that is set in the connected navigation apparatus 100B, to the navigation apparatus 100B. On the other hand, when a touch is applied to "HOME" 1303a on the visual information 1303, the destination that is set in the connected navigation apparatus 100B. In addition, when the touch is applied to "Burger King" on the visual information 1303, the visual information 1303 being output is changed to a map screen on which a position of selected "Burger King" is displayed.

On the other hand, in a case where the stress index for the user remains unchanged, the watch-type terminal 200, as illustrated in FIG. 13C, outputs visual information 1305b that recommends reproducing of a piece of music 1305a (for example, "Classic 2") that the user usually likes to listen to. In addition, a result of re-setting the path, the position 1306a of "Burger King" is displayed on the navigation apparatus 100B.

In addition, although not illustrated, the vehicle system, which is connected to the watch-type terminal 200, operates apparatuses that are not directly associated with the driving of the vehicle, but are installed in the vehicle for providing the user with an environment suitable for driving, such as an air conditioner (for example, for decreasing temperature in a case of the drowsy state), a car audio player (for example, for reproducing pieces of classical music in a case of the stress index at a high level), lighting fixtures (for example, for lighting up the inside of the vehicle in the case of the drowsy state), and the like.

In the wearable device and the method of operating the wearable device according to the present invention, which are described above, the user is notified in advance whether or not the current state of the user is suitable for the safety driving, using the pieces of biological information that have been sensed all the while, after the user gets in a vehicle but before the user starts to drive. This contributes to the safety driving, thereby in advance preventing a vehicle accident due to the driver's dozing-off at the wheel and the like. In addition, in the case where it is determined that the current state of the user is not suitable for the safety driving, the suitable situational information is provided using the pattern of the recorded biological signals, in such a manner that the user rapidly returns to the state suitable for the safety driving. Accordingly, the driving without due care and attention can be prevented that arises from the emotional state. Furthermore, the current state of the driver and the cause of the current state of the driver are determined with more precision in checking the current state of the driver, by tracking and reflecting the information on the user's activity that is done before the user gets in the vehicle.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable device comprising:
a main body configured to be worn by a user;
a sensing unit configured to sense a biological signal of the user;
a controller configured to:
collect log information including information relating to the biological signal of the user and information relating to a state of the user;
store an index pattern that indicates a correspondence between the information relating to the biological signal of the user with the information relating to the state of the user that are included in the collected log information;
determine a reference driving index that indicates values of the stored index pattern that are suitable for the user to drive a vehicle, wherein when the stored index pattern is changed based on the biological signal that is accumulated for a predetermined period of time, the reference driving index is updated;
based on detecting a vehicle entry event for the user, determine, relative to the reference driving index, a current driving index corresponding to the biological signal of the user that is sensed during a period of time extending before and after the vehicle entry event for the user; and
output feedback for notifying the user of the state of the user corresponding to a result of determining the current driving index,
wherein the reference driving index and the current driving index each includes a stress index and a drowsiness index,
wherein the reference driving index includes threshold values of the stress index and the drowsiness index for which the stress index and the drowsiness index are suitable for the user to safely drive a vehicle,
wherein the stress index and the drowsiness index each includes an index ascending section and an index recovering section, and
wherein the controller is further configured to, based on determining that the current driving index is not suitable for the user to drive:
search the collected log information for information related to a situation that is recorded in the index recovering section corresponding to a current state of the user for which the current driving index is not suitable for the user to drive, and
output, based on the searched log information, the feedback in a manner configured to recreate the situation that is recorded in the index recovering section corresponding to the current state of the user.

2. The wearable device of claim 1, wherein the controller is further configured to, based on determining that the current driving index for the user is not suitable for the user to drive, output the feedback in a variable manner according to deviation of the current driving index from the reference driving index.

3. The wearable device of claim 1, wherein the controller is further configured to, based on determining whether the current driving index for the user is suitable for the user to drive, output at least one of an alert indicating that a current state of the user is not suitable for safe driving, or a notification indicating that the current state of the user is suitable for safe driving.

4. The wearable device of claim 3, wherein the alert comprises one or more of a sound, a vibration, a light, or a screen change, and
wherein the controller is further configured to adjust a level of the alert according to the current state of the user.

5. The wearable device of claim 1, further comprising:
a touch screen;
wherein the controller is further configured to:
based on determining that the current driving index is not suitable for the user to drive, display visual information on the touch screen indicating a current state of the user, and
output corresponding feedback based on a predetermined touch input being applied to the touch screen.

6. The wearable device of claim 1, wherein the controller is further configured to, based on determining that the current driving index is not suitable for the user to drive, search the collected log information for the information related to the situation that is recorded in the index recovering section having the shortest time duration for the current state of the user.

7. The wearable device of claim 1, wherein the controller is further configured to, based on determining that the current driving index is not suitable for the user to drive and using the biological signal of the user detected during the index recovering section for the current state of the user and using external context information, output the feedback in a manner that is configured to adjust the current driving index of the user, relative to the reference driving index, to be suitable for the user to drive.

8. The wearable device of claim 1, wherein the controller is further configured to:
based on determining that the current driving index is not suitable for the user to drive, output a message requesting an input from the user regarding a current state of the user, and
adjust the reference driving index to reflect the user's input in response to the message that was output.

9. The wearable device of claim 1, wherein the index pattern includes a physical index pattern and an emotional index pattern for the user,
wherein the physical index pattern is generated based on the biological signal of the user being sensed during a predetermined time of day, and
wherein the emotional index pattern is generated based on the biological signal of the user being sensed in a predetermined situation.

10. The wearable device of claim 1, wherein the controller is further configured to, based on detecting the vehicle entry event of the user, determine that the current driving index has changed based on determining a difference between the biological signal of the user sensed during the period of time before the vehicle entry event and the biological signal sensed after the vehicle entry event.

11. The wearable device of claim 1, further comprising:
a wireless communication unit, connected to a vehicle-mounted control apparatus, that is configured to receive information relating to a state of the vehicle,
wherein the controller is further configured to:
determine the vehicle entry event for the user based on the received information relating to the state of the vehicle, and
control the wireless communication unit such that information regarding the state of the user corresponding to the current driving index is provided to the vehicle-mounted control apparatus.

12. The wearable device of claim 11, wherein the controller is further configured to, based on the information regarding the state of the user corresponding to the current driving index, control the wireless communication unit such that a control signal for changing a destination or a moving path that is set in advance in the vehicle-mounted control apparatus is provided to the vehicle system.

13. The wearable device of claim 1, wherein the controller is further configured to:
based on detecting the vehicle entry event for the user, compare the stored index pattern with the biological signal of the user sensed over a period of time before the vehicle entry event;
recognize information regarding an activity of the user that occurred before the vehicle entry event;
output a message asking for the user's confirming of the recognized information regarding the activity of the user; and
based on the user's confirming of the recognized information regarding the activity of the user, determine the current driving index reflecting the recognized information regarding the activity of the user.

14. A method of operation of a wearable device that is worn by a user, the method comprising:
sensing, by a sensing unit of the wearable device, a biological signal of the user;
collecting, by a controller of the wearable device, log information including information relating to the biological signal and information relating to a state of the user;
storing, by the controller, an index pattern that indicates a correspondence between the information relating to the biological signal of the user with the information relating to the state of the user that are included in the collected log information;
determining, by the controller, a reference driving index that indicates values of the stored index pattern that are suitable for the user to drive a vehicle, wherein when the stored index pattern is changed based on the biological signal that is accumulated for a predetermined period of time, the reference driving index is updated;
based on detecting a vehicle entry event for the user, determining, by the controller and relative to the reference driving index, a current driving index corresponding to the biological signal of the user that is sensed during a period of time extending before and after vehicle entry event for the user, based on the set reference driving index; and
outputting, by the controller, feedback for notifying the user of the state of the user corresponding to a result of determining the current driving index,
wherein the reference driving index and the current driving index each includes a stress index and a drowsiness index,
wherein the reference driving index includes threshold values of the stress index and the drowsiness index for which the stress index and the drowsiness index are suitable for the user to safely drive a vehicle,
wherein the stress index and the drowsiness index each includes an index ascending section and an index recovering section, and
wherein the method further comprises, based on determining that the current driving index is not suitable for the user to drive:
searching the collected log information for information related to a situation that is recorded in the index recovering section corresponding to a current state of the user for which the current driving index is not suitable for the user to drive, and
outputting, based on the searched log information, the feedback in a manner configured to recreate the situation that is recorded in the index recovering section corresponding to the current state of the user.

15. The method of claim 14, wherein outputting the feedback comprises outputting, by the controller and based on determining that the current driving index for the user is not suitable for the user to drive, the feedback in a variable manner according to deviation of the current driving index from the reference driving index.

16. The method of claim 14, wherein determining the current driving index comprises:
determining, by the controller and based on detecting the vehicle entry event of the user, that the current driving index has changed based on determining a difference between the biological signal of the user sensed during the period of time before the vehicle entry event and the biological signal sensed after the vehicle entry event.

17. The method of claim 14, further comprising:
receiving information relating to a state of the vehicle in which a vehicle-mounted control apparatus is connected to the wearable device;
determining the vehicle entry event of the user based on the received information relating to the state of the vehicle; and providing information regarding the state of the user corresponding to the current driving index to the vehicle-mounted control apparatus.

\* \* \* \* \*